United States Patent
Nagami et al.

(10) Patent No.: US 6,515,999 B1
(45) Date of Patent: *Feb. 4, 2003

(54) ROUTER APPARATUS AND METHOD OF USING A VIRTUAL CONNECTION TO TRANSFER A PACKET

(75) Inventors: Kenichi Nagami, Chiba-ken (JP); Hisako Tanaka, Tokyo (JP); Yasuhiro Katsube, Kanagawa-ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,935

(22) Filed: Apr. 1, 1997

(30) Foreign Application Priority Data

Apr. 2, 1996 (JP) .............................. 8-080240

(51) Int. Cl.[7] .............................. H04L 12/28
(52) U.S. Cl. .................. 370/409; 370/395.21
(58) Field of Search .................. 370/395, 392, 370/397, 399, 400, 401, 408, 409, 410, 420, 230, 231, 235, 236, 851, 352, 389, 396, 398, 402, 431, 437; 395/466, 468, 200.7, 200, 200.72, 200.75, 200.66–200.68, 856–858; 709/226–229

(56) References Cited

U.S. PATENT DOCUMENTS

| | | | | |
|---|---|---|---|---|
| 5,282,270 A | * | 1/1994 | Oppenheimer et al. | ..... 395/200 |
| 5,416,771 A | * | 5/1995 | Iwata | ..... 370/410 |
| 5,461,611 A | * | 10/1995 | Drake et al. | ..... 370/420 |
| 5,473,603 A | * | 12/1995 | Iwata | ..... 370/410 |
| 5,541,927 A | * | 7/1996 | Kristol et al. | ..... 370/408 |
| 5,732,078 A | * | 3/1998 | Arango | ..... 370/401 |
| 5,793,767 A | * | 8/1998 | Soda et al. | ..... 370/409 |
| 5,796,736 A | * | 8/1998 | Suzuki | ..... 370/395 |
| 5,822,319 A | | 10/1998 | Nagami et al. | |
| 5,835,710 A | * | 11/1998 | Nagami et al. | ..... 370/351 |
| 5,892,924 A | * | 4/1999 | Lyon | ..... 395/200.75 |
| 6,021,263 A | * | 1/2000 | Kujoory | ..... 370/409 |
| 6,104,713 A | | 8/2000 | Nagami et al. | |
| 6,343,322 B2 | | 1/2002 | Nagami et al. | |

OTHER PUBLICATIONS

Birman, RSVP based services for ATM network, IBM, p. 1–36, Nov. 1995.*
Zhang, RSVP, IEEE, p. 8–18, Sep. 1993.*
Yasuhiro Katsube et al., Router Architecture Extensions for ATM:Overview, <draft–katsube–router–atm–overview–02.txt>, Internet Engineering Task Force, Internet Draft, pp. 1–19, Mar. 25, 1996.

* cited by examiner

*Primary Examiner*—Steven Nguyen
(74) *Attorney, Agent, or Firm*—Finnegan, Henderson, Farabow, Garrett & Dunner, L.L.P.

(57) ABSTRACT

A router is usable to transfer a packet from a first node belonging to one logical network to a second node belonging to another logical network. The router receives a first message for resource reservation from the second node, and stores a correspondence relationship between a first virtual connection available for receiving a packet of a specified flow from the first node and a second virtual connection available for transmitting the packet of the specified flow to the second node, when the first and second virtual connections exist. The router transmits a second message for resource reservation based on the first message to the first node, when the correspondence relationship can be stored. Alternatively, the router, after transmitting the second message to the first node irrespective of the correspondence relationship, transmits a cancellation message to the first node for canceling the second message depending upon whether the correspondence relationship can be stored.

10 Claims, 30 Drawing Sheets

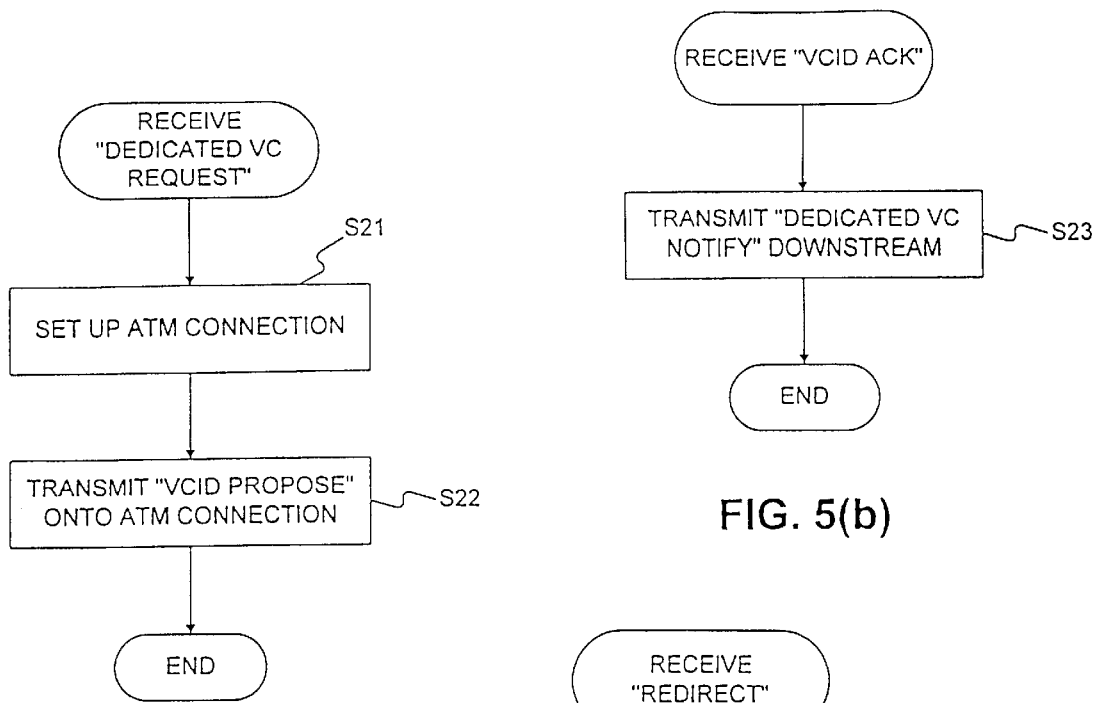
FIG. 5(a)
FIG. 5(b)
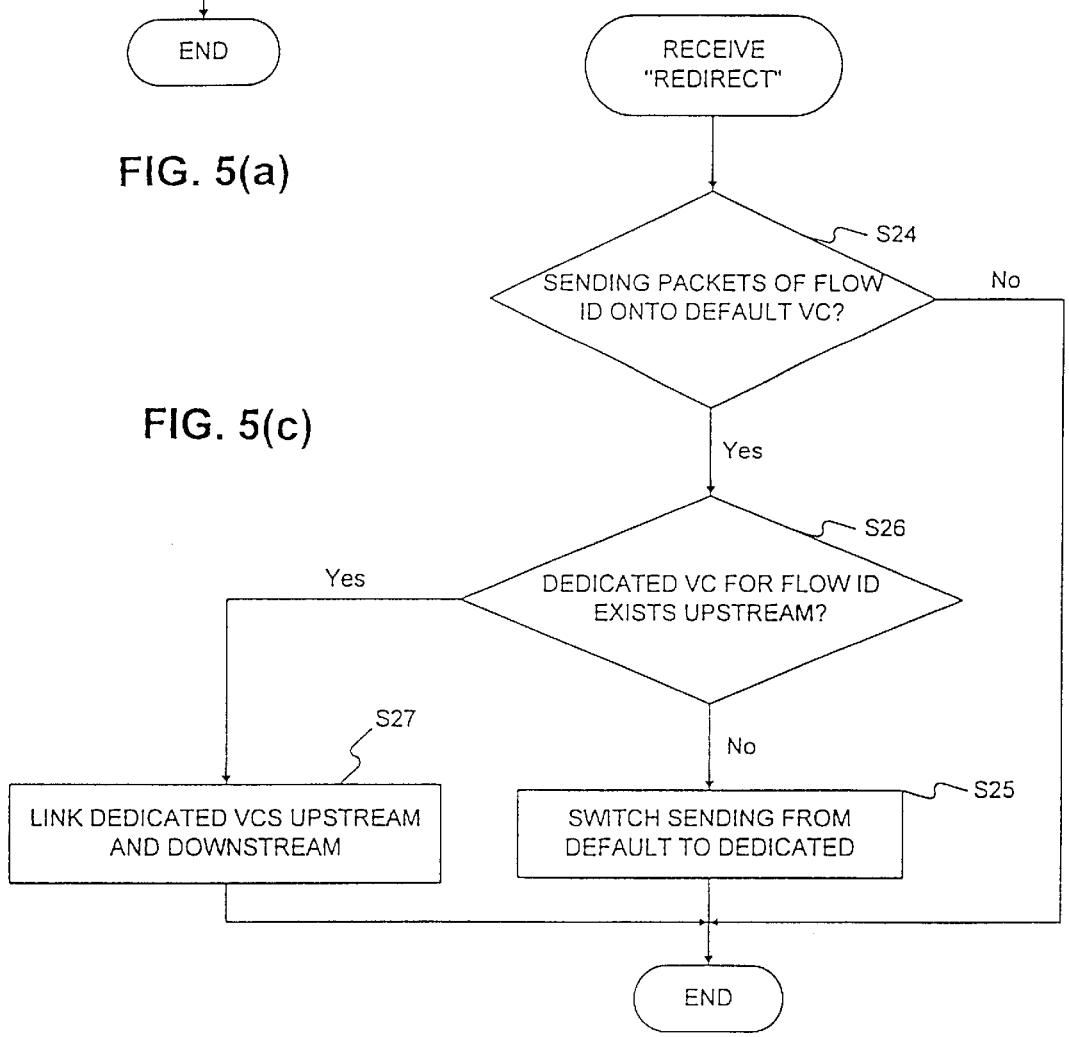
FIG. 5(c)

ROUTER APPARATUS AND METHOD OF USING A VIRTUAL CONNECTION TO TRANSFER A PACKET

BACKGROUND OF THE INVENTION

A. Field of the Invention

The present invention relates to network systems. More specifically, the invention relates to a router apparatus located at a boundary of logical networks and a method for setting up a virtual connection to transfer packets through the router apparatus.

B. Description of the Background Art

It is known to use a router apparatus to connect LANs (local area networks), and transfer packets from one LAN to another LAN. A packet includes source and destination network-layer addresses in addition to communication data. The router apparatus uses the address information to determine an output interface and a next-hop node of the packet.

Such a known router apparatus can perform not only unicast communication in which packets are transferred from a single source to a single destination, but also multicast communication in which packets are sent from a single source to multiple destinations.

In recent years, a technique of resource reservation at the router has been applied when sounds and/or pictures are transferred using packets. Transferring sounds/pictures and other data without this technique results in broken sound and corrupt video. The resource reservation technique is useful not only in transferring sounds/pictures but also in transferring priority data. In order to perform the resource reservation at the router, it is necessary to exchange resource reservation information between nodes such as routers.

One currently developed protocol for the resource reservation technique, RSVP (Resource ReSerVation Protocol), applies to both unicast and multicast. In RSVP, the resource reservation is performed from a destination node to a source node. Specifically, a PATH message is sent from node to node along a path in a direction flowing from the source node to the destination node, and lets routers along this path. store information regarding the path on which the data is to be transferred. This PATH message contains an identifier that specifies the data on which the resource reservation is to be performed and an IP address of the node that sent the PATH message.

When the destination node receives the PATH message, it notifies its request for resource reservation by sending an RESV message upstream, back to the source node in response to the PATH message. This RESV message contains an identifier that specifies the data for which resources are to be reserved and a quality of service (QOS) requested by the destination node.

When a node receives the RESV message, it determines whether its network-layer (e.g., Internet Protocol (IP)) processing unit has sufficient capacity for this resource reservation. If so, the node performs network-layer scheduling to reserve the resources and transfers the RESV message upstream. If not, the node sends an RESV_ERROR message downstream. This procedure is repeated until the RESV message reaches the source node, thereby completing the resource reservation.

A significant problem may arise, however, in such a router apparatus and resource reservation technique. It is often the case that the router has a relatively low capacity in its network-layer processing unit. As such, the reservation of resources sufficient for the requested service quality indicated in the RESV message can seldom be achieved by the network-layer scheduling. Accordingly, a router apparatus and resource reservation technique is needed to avoid this problem.

SUMMARY OF THE INVENTION

It is therefore an object of the present invention to provide a scheme for performing resource reservation that avoids limitations in the network-layer processing capacity of the routers, yet correctly reserves resources at a certain router.

Another object of the present invention is to provide a technique for efficiently setting up a virtual connection for multicast communication when a lower-layer switching function is used at a router.

Yet another object of the present invention is to provide a technique for efficiently setting up a virtual connection for multicast communication, while uniquely identifying the connection between neighboring nodes, where a network includes a switch that changes an identifier of the connection between neighboring nodes.

According to one aspect of the present invention, there is provided a router apparatus, comprising a memory capable of storing a correspondence relationship between a first virtual connection to be used in receiving a packet from one logical network and a second virtual connection to be used in transmitting the packet to another logical network; a device for receiving a first message for resource reservation from said another logical network; and a device for transmitting a second message for resource reservation based on the first message received by the device for receiving to said one logical network, responsive to an existence of the first and second virtual connections, the correspondence relationship between the first and second virtual connections being to be stored in the memory.

In another aspect, there is provided a router apparatus, comprising a memory capable of storing a correspondence relationship between a first virtual connection to be used in receiving a packet from one logical network and a second virtual connection to be used in transmitting the packet to another logical network; a device for receiving a first message for resource reservation from said another logical network; a device for transmitting a second message for resource reservation based on the first message received by the device for receiving to said one logical network; and a device for canceling the second message transmitted by the device for transmitting, responsive to an existence of the first and second virtual connections, the correspondence relationship between the first and second virtual connections being to be stored in the memory.

In a further aspect, there is provided a method of operating a router usable to transfer a packet from a first node belonging to one logical network to a second node belonging to another logical network, comprising the steps of receiving a first message for resource reservation from the second node; storing a correspondence relationship between a first virtual connection available for receiving a packet of a specified flow from the first node and a second virtual connection available for transmitting the packet of the specified flow to the second node, when the first and second virtual connections exist; and transmitting a second message for resource reservation based on the first message to the first node, when the correspondence relationship can be stored.

In yet another aspect, there is provided a method of operating a router usable to transfer a packet from a first node belonging to one logical network to a second node belonging to another logical network, comprising the steps of receiving a first message for resource reservation from the second node; transmitting a second message for resource reservation based on the first message to the first node; storing a correspondence relationship between a first virtual connection available for receiving a packet of a specified flow from the first node and a second virtual connection available for transmitting the packet of the specified flow to the second node, when the first and second virtual connections exist; and transmitting a cancellation message to the first node for canceling the second message, depending upon whether or not the correspondence relationship can be stored.

In still a further aspect, there is provided a method of transferring a packet from one logical network to a plurality of nodes belonging to another logical network via a router, a default virtual connection being set up between the router and each of the nodes, comprising the steps of setting up a dedicated virtual connection from the router to at least one of the nodes, the dedicated virtual connection being dedicated for transmitting a packet of a specified flow to the nodes and capable of being a point-to-multipoint connection; transferring the packet of the specified flow received from said one logical network onto the dedicated virtual connection without a network-layer destination analysis; receiving a message through the default virtual connection from one of the nodes; and maintaining the dedicated virtual connection based on receipt of the message.

In an additional aspect, there is provided a method of transferring a packet from one logical network to a plurality of nodes belonging to another logical network via a router, a default virtual connection being set up between the router and each of the nodes, comprising the steps of setting up a dedicated virtual connection from the router to at least one of the nodes, the dedicated virtual connection being dedicated for transmitting a packet of a specified flow to the nodes and capable of being a point-to-multipoint connection; transmitting an identifier of the dedicated virtual connection onto the dedicated virtual connection, the identifier being common between the router and at least one of the nodes; receiving the identifier through the default virtual connection from a corresponding one of the nodes; and transferring the packet of the specified flow received from said one logical network onto the dedicated virtual connection without a network-layer destination analysis.

Other features and advantage of the present invention will be become apparent from the following description taken in conjunction with the accompanying drawings.

Both the foregoing general description and the following detailed description provide examples consistent with this invention and explain how to make and use systems and methods consistent with the invention. These description do not restrict the claimed invention.

BRIEF DESCRIPTION OF THE DRAWINGS

FIGS. 5(a)–5(c) show an operation within an upstream router according to one embodiment of the present invention in case of upstream dedicated VC set-up.

DETAILED DESCRIPTION OF THE PREFERRED EMBODIMENTS

A. RSVP (Resource ReSerVation Protocol)

In RSVP, a router achieves a QOS for transferring packets associated with a particular data flow identified by any one or more of a source address, a source port, a destination address, and a destination port. An identifier identifying such a flow will herein be termed a "Flow ID." Scheduling of packet transfer within the router, for example, can achieve this QOS by transferring the packets, for which resources have been reserved, earlier.

B. Router with Lower-layer Switching Function

A CSR (Cell Switched Router) is an exemplary router capable of transferring packets at a layer lower than the network layer (e.g., in ATM (Asynchronous Transfer Mode) cell units). A CSR has an ATM switch function in addition to a function for transferring packets in IP packet units, to achieve high throughput and low latency packet transfer for an internetwork environment.

Figure 1:
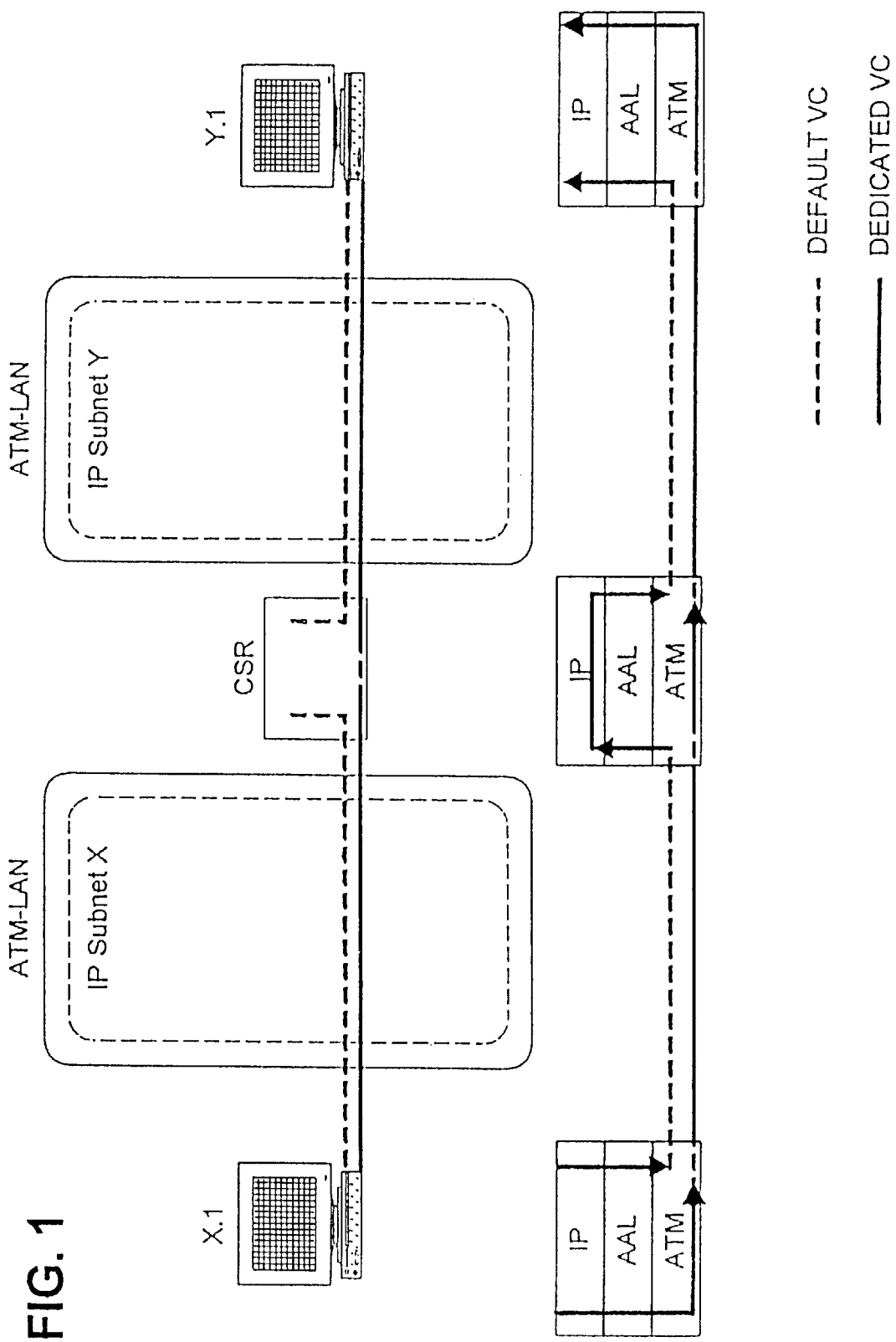
FIG. 1 explains an operation of a Cell Switched Router (CSR).

A simple description of the operation of a CSR will now be given, referring to FIG. 1, where packets are transferred from X.1 through the CSR to Y.1.

In order to perform an IP packet transfer, packets are sent on an ATM connection set up for transfer of packets of various destinations from X.1 to the CSR. This ATM connection will be called a default VC (Virtual Connection). The CSR determines a next-hop node by referring to the destination of the IP packet. In this case, the next-hop node is Y.1, so packets are transferred to Y.1 by sending the packets on a default VC.

In order to perform an ATM cell transfer, an ATM connection from X.1 to the CSR dedicated to transfer of packets to Y.1, and an ATM connection from the CSR to Y.1 dedicated to transfer of packets to Y.1 are set up. These ATM connections will be called dedicated VCs. The CSR sets up the ATM switch function in the CSR so as to transfer ATM cells from one dedicated VC to the other dedicated VC bypassing IP processing at the CSR. That is, the CSR stores in a routing table at the ATM level a correspondence relationship between a VPI/VCI at the receiving port of the dedicated VC from X.1 to the CSR and a VPI/VCI at the sending port of the dedicated VC from the CSR to Y.1. In this way, a bypass pipe (i.e. a cut-through connection) can be formed that directly links the dedicated VCs belonging to different logical networks (e.g. IP subnets).

When X.1 sends packets to Y.1, the packets are transferred from X.1 to the CSR through the dedicated VC for Y.1, and then the CSR transfers the packets on the dedicated VC for Y.1, while packets are still in the form of ATM cells, by referring to the ATM-level routing table.

In the above example, packet transfer through the bypass pipe results in the transfer of packets in ATM cell units. Alternatively, the packet transfer through the bypass pipe may be transferring packets in AAL (ATM Adaptation Layer) frame units. In this case, the AAL frame transfer is performed by referring to a routing table at the ATM level. In either case, packets are transferred without network-layer processing.

Also, packet transfer through the bypass pipe may transfer packets from a dedicated VC, to which other network-layer processing (e.g. in the case of IP, decrementation of TTL (Time to Live), calculation of check sum, etc.) than determination of output VC based on the network-layer destination address with reference to an IP-level routing table is applied, onto a dedicated VC to the next-hop node. In this case too, the packet transfer can be performed by determining the output VC with reference to an ATM-level routing table. In this case, packets are transferred with only some of the network-layer processing, without destination analysis at network layer.

The embodiments according to the present invention, which will be described below, can be applied to any of the configurations using a CSR as described above.

C. Implementation of RSVP on CSR in the Upstream Direction

If a CSR is used as a router, packet transfer can be performed in ATM cell units by setting up dedicated VCs and using the ATM switch function, so packet transfer scheduling necessary for resource reservation can be performed by the ATM switch function. Specifically, for packets for which resources have been reserved, high-speed transfer can be achieved by employing the ATM switch function (e.g. ATM cell transfer, AAL frame transfer, or packet transfer in which some of the IP processing is omitted). A set-up procedure for a dedicated VC with RSVP will be described below.

The following three cases are takes as examples: 1) an ATM connection is SVC (Switched Virtual Connection) and communication is for unicast; 2) an ATM connection is VP (Virtual Path) and communication is for unicast; and 3) an ATM connection is SVC and communication is for multicast.

(C-1) SVC and Unicast

Figure 2:
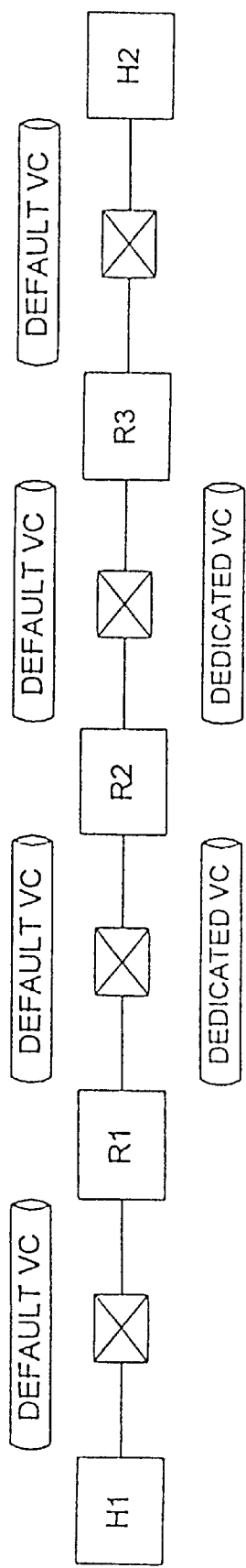
FIG. 2 shows an exemplary network topology in which the embodiments according to the present invention are applied.

The procedure will now be described for set-up of a dedicated VC in an exemplary network topology as shown in FIG. 2. H1 and H2 are hosts, and R1, R2 and R3 are routers. In this system, default VCs are set up between adjacent nodes. Either a host or a router is referred to as a node.

The procedure performed between R1, R2 and R3 is described below. The procedure of transferring data between a host and a router, such as between H1 and R1 or between R3 and H2, is substantially the same as the procedure between routers when the host is connected to a virtual connection network.

First, the case will be described in which a message notifying a neighboring node of which dedicated VC is used to transfer packets belonging to a given flow is sent in an out-band manner.

Figure 3:
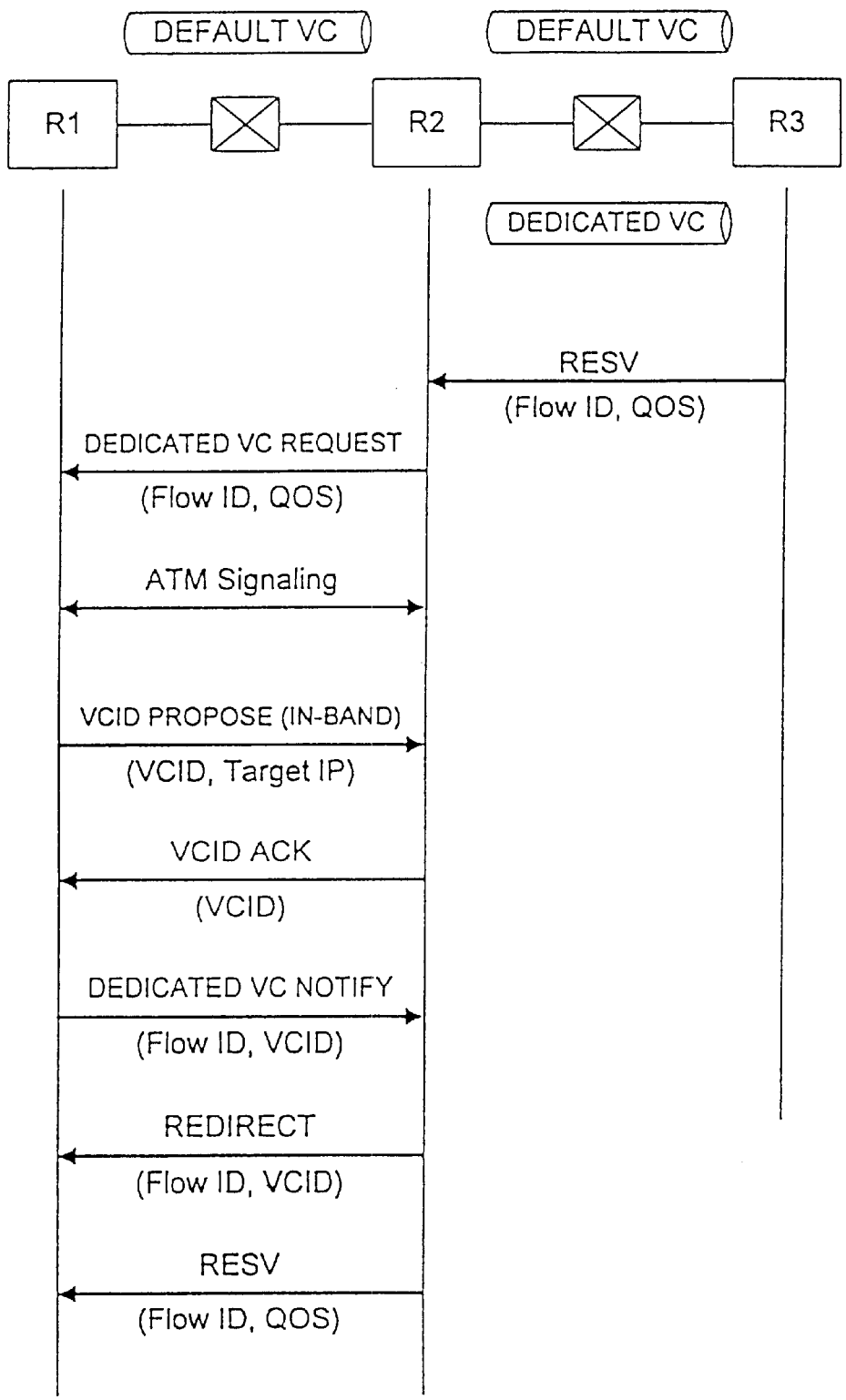
FIG. 3 shows an exemplary initial condition in networks and subsequent message exchanges between routers according to one embodiment of the present invention in case of Switched Virtual Connection (SVC), unicast, out-band, and upstream dedicated VC set-up.
Figure 4A:
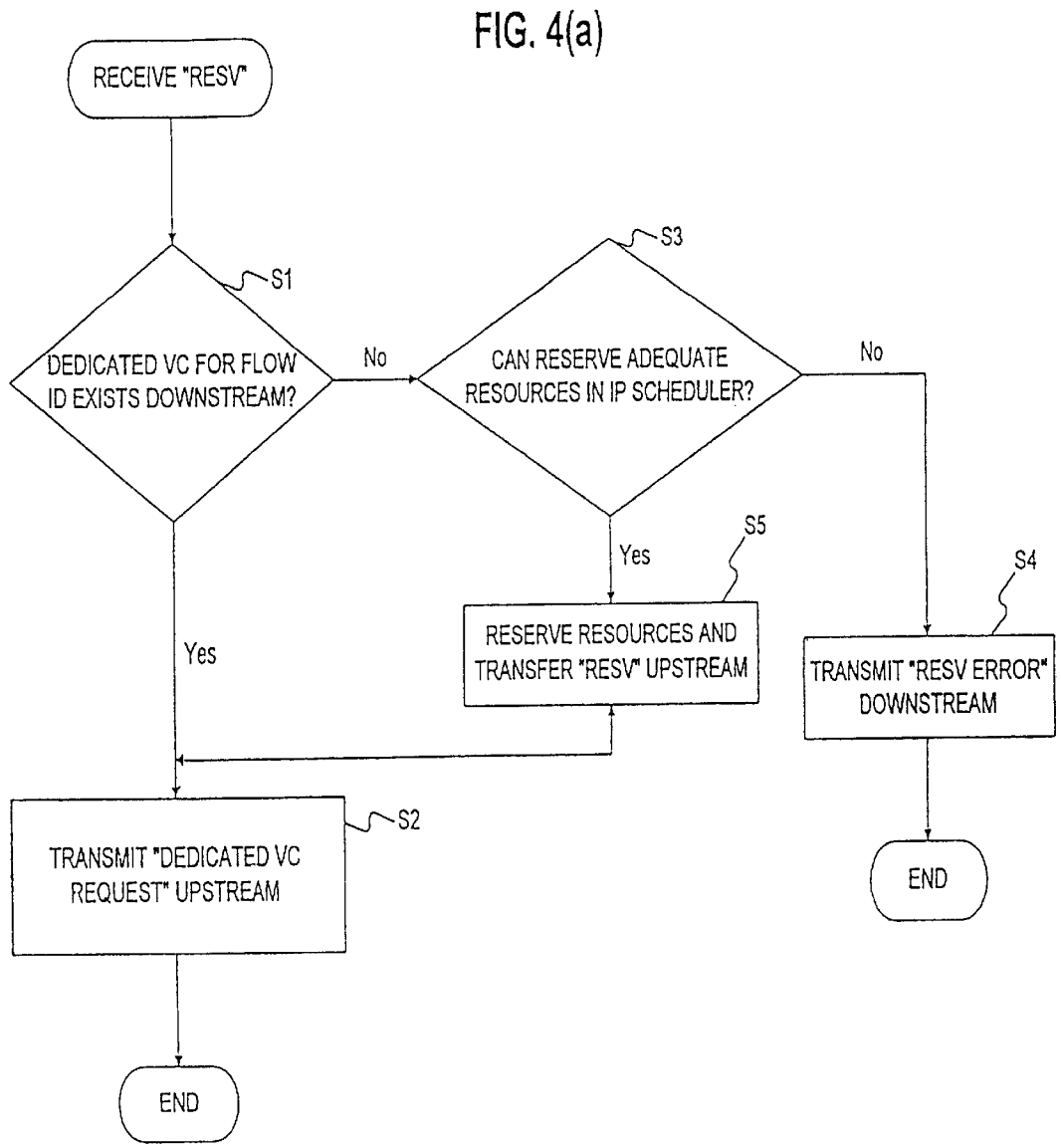
FIGS. 4(a)–4(c) show an operation within a downstream router according to one embodiment of the present invention in case of upstream dedicated VC set-up.
Figure 4C:
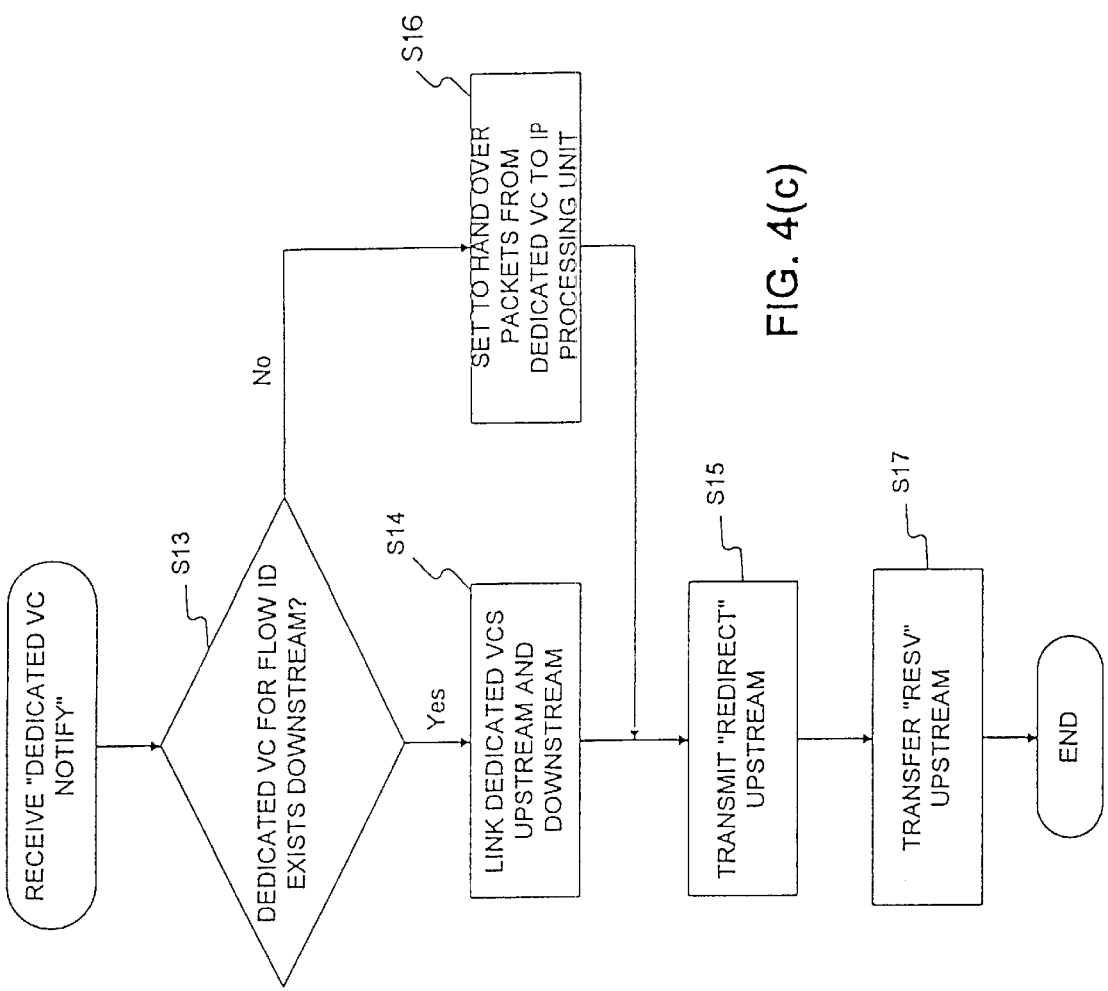
Figure 4B:
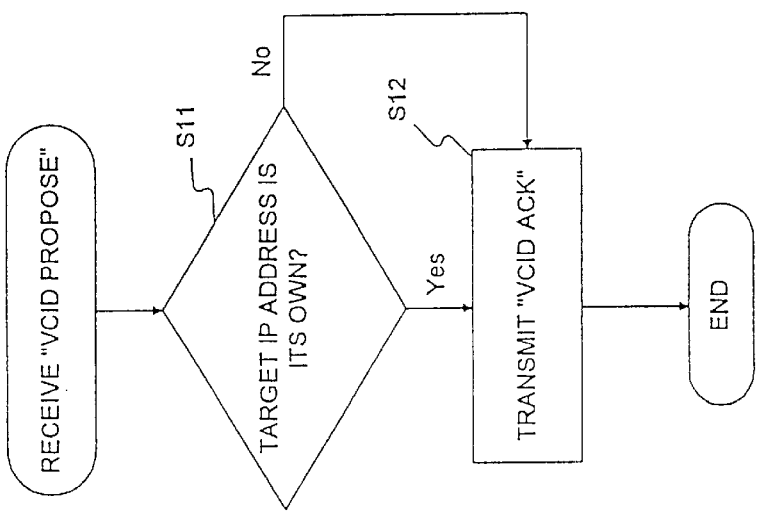

A method of resource reservation at router R2 will be described when routers R1, R2, and R3 are configured as shown in FIG. 3. As an initial condition, default VCs from router R1 to router R2 and from router R2 to router R3 are set up, and a dedicated VC from router R2 to router R3 is set up. FIG. 3 shows message exchanges between the routers. FIGS. 4(a)–4(c) show an operation within a router on the downstream side (e.g. R2 in FIG. 3). FIGS. 5(a)–5(c) show an operation within an upstream router (e.g. R1 in FIG. 3).

This process can be best understood by example. An RSVP reservation (RESV) message from router R3 in FIG. 3 arrives at router R2. The RESV message includes a Flow ID indicating for which packet flow resources are to be reserved, and a QOS requested by a data receiving node (e.g., host H2). The Flow ID may be a set containing source IP address/port and destination IP address/port, or a destination IP address only, or a flow ID of IPv6: QOS information may include a required bandwidth and/or a allowed delay.

In accordance with the flow charts of FIGS. 4(a)–4(c), router R2, on receipt of an RESV message, checks whether a dedicated VC on the downstream side for a flow of Flow ID in the RESV message (S1) is set up. In this example of FIG. 3, a dedicated VC is set up between router R2 and router R3, so a dedicated VC request message is sent to a node (R1) on the upstream side (S2). This message contains the same Flow ID and QOS information as the received RESV message. Router R2 can preferably determine an ATM-level quality from the IP-level QOS in the RESV message to write it into the dedicated VC request message as the QOS information.

If no dedicated VC is set up on the downstream side, router R2 checks whether the requested resources can be guaranteed by the IP processing unit (S3). If adequate resources are available, resource reservation is performed by scheduling of IP transfer, and an RESV message is sent upstream (S5). Also, a dedicated VC request message is sent upstream (S2). If adequate resources are not available, an RESV ERROR message is sent to the downstream node (e.g., router R3) (S4).

In the above example, router R2 sends a dedicated VC request message upstream even when no downstream dedicated VC is set up and necessary resources are available in the IP scheduler, to cope with the possibility that some routers on the path from the source node to router R2 might be able to guarantee the requested resources only by a bypass pipe transfer using dedicated VCs. In particular, for a destination node (host H2) or a router that is positioned on the boundary of a connectionless-type network and a connection-oriented network where a destination node is connected to the connectionless-type network, a dedicated VC request message is preferably sent upstream in cases except where the RESV ERROR message is returned.

In accordance with the flow charts of FIGS. 5(a)–5(c), router R1 that has received the dedicated VC request message sets up an ATM connection (dedicated VC) that satisfies the requested QOS to the node (router R2) that sent the dedicated VC request message, using ATM signaling (S21).

When this ATM connection is created, a common identifier of this connection, called a VCID, is negotiated by the neighboring nodes. The neighboring nodes can recognize the connection uniquely even when the connection reaches the next-hop node via a switch that changes an identifier of the connection (e.g. VPI/VCI). The VCID is a unique identifier in the logical network to which routers R1 and R2 belong. A VCID is determined, for example, by attaching a global unique node ID and a sequence number issued in respect of VCIDs by this node. Router R1 sends the VCID which has been created in this way to the downstream node R2 by transmitting a VCID propose message onto the created ATM connection (dedicated VC) (S22).

This message includes the VCID proposed by the source side (e.g., router R1) and a target IP address (e.g., IP address of router R2). As will be described later, the target IP address is written in order to cope with the situation where the dedicated VC is expanded to a point-multipoint connection.

A node (router R2) that has received the VCID propose message checks whether the target IP address included in this message is its own IP address (S11). If so and router R2 approves the proposed VCID, router R2 sends a VCID ACK message through the default VC to the upstream node (router R1) (S12). The VCID ACK message contains at least the VCID proposed by the source-side node and approved by this node. By this procedure, the negotiation of VCID is completed.

Router R1 sends a dedicated VC notify message to router R2, in order to notify the downstream node (router R2) that VCID negotiation has been completed and dedicated VC can now be used (S23). This message is sent through the default VC (i.e. a VC different from the dedicated VC that is used for sending packets specified by Flow ID). This message includes the Flow ID and the VCID.

A node (router R2) that has received the dedicated VC notify message knows that the dedicated VC specified by the VCID is available to be used exclusively for the flow specified by the Flow ID, and therefore, if there is a downstream dedicated VC having this Flow ID (S13:yes), links the upstream dedicated VC and the downstream dedicated VC directly (S14). That is, router R2 stores the correspondence relationship of these dedicated VCs in the ATM-level routing table. If there is no dedicated VC for the Flow ID on the downstream side (S13:no), router R2 sets an inside routing table to hand over packets received from the upstream dedicated VC to the IP processing unit (S16). This step corresponds to the case where a dedicated VC is set up on the upstream side in response to a dedicated VC request message sent upstream, though resources can be reserved without utilizing the ATM switch function.

When the dedicated VC becomes usable at router R2, a redirect message is sent upstream (S15). This redirect message is sent by the default VC and includes the Flow ID and VCID.

An upstream node (router R1) that has received the redirect message, when packets of the Flow ID included in this message are still being sent onto the default VC (S24:yes) and there is no upstream dedicated VC having the same Flow ID (S26:no), sets its IP processing unit so as to send packets associated with this Flow ID onto the dedicated VC (S25). That is, router R1 rewrites the routing information used by the IP processing unit such that packets sent from further upstream nodes (H1) through the default VC are transferred onto the dedicated VC to router R2.

If a dedicated VC having the same Flow ID upstream of router R1 exists (S26:yes), this upstream dedicated VC and the dedicated VC to router 2 are directly linked (S27).

Finally, since the QOS request of RSVP can be satisfied by router R2, router R2 transfers the RESV message through the default VC to router R1 (S17). In an alternative embodiment, the order of sending the redirect message in S15 and the RESV message in S17 may be reversed.

The resource reservation at router R2 is completed as described above. The corresponding dedicated VC is held by sending a redirect message as described above periodically from router R2 to router R1 with suitable timing. To hold the dedicated VC, this message can be replaced by the RESV message that is periodically sent upstream. The dedicated VC for which a redirect message (or an RESV message) has ceased to be sent will be released.

Next, the case will be described in which a message notifying a neighboring node of which dedicated VC is used to transfer packets belonging to a given flow is sent in an in-band manner.

In the out-band procedure described above, the three messages VCID propose, VCID ACK, and dedicated VC notify are transmitted after sending a dedicated VC request message and performing ATM signaling. However, it is possible to dispense with the VCID propose and VCID ACK messages by allowing the dedicated VC notify message to flow onto the newly created ATM connection (dedicated VC).

Figure 6:
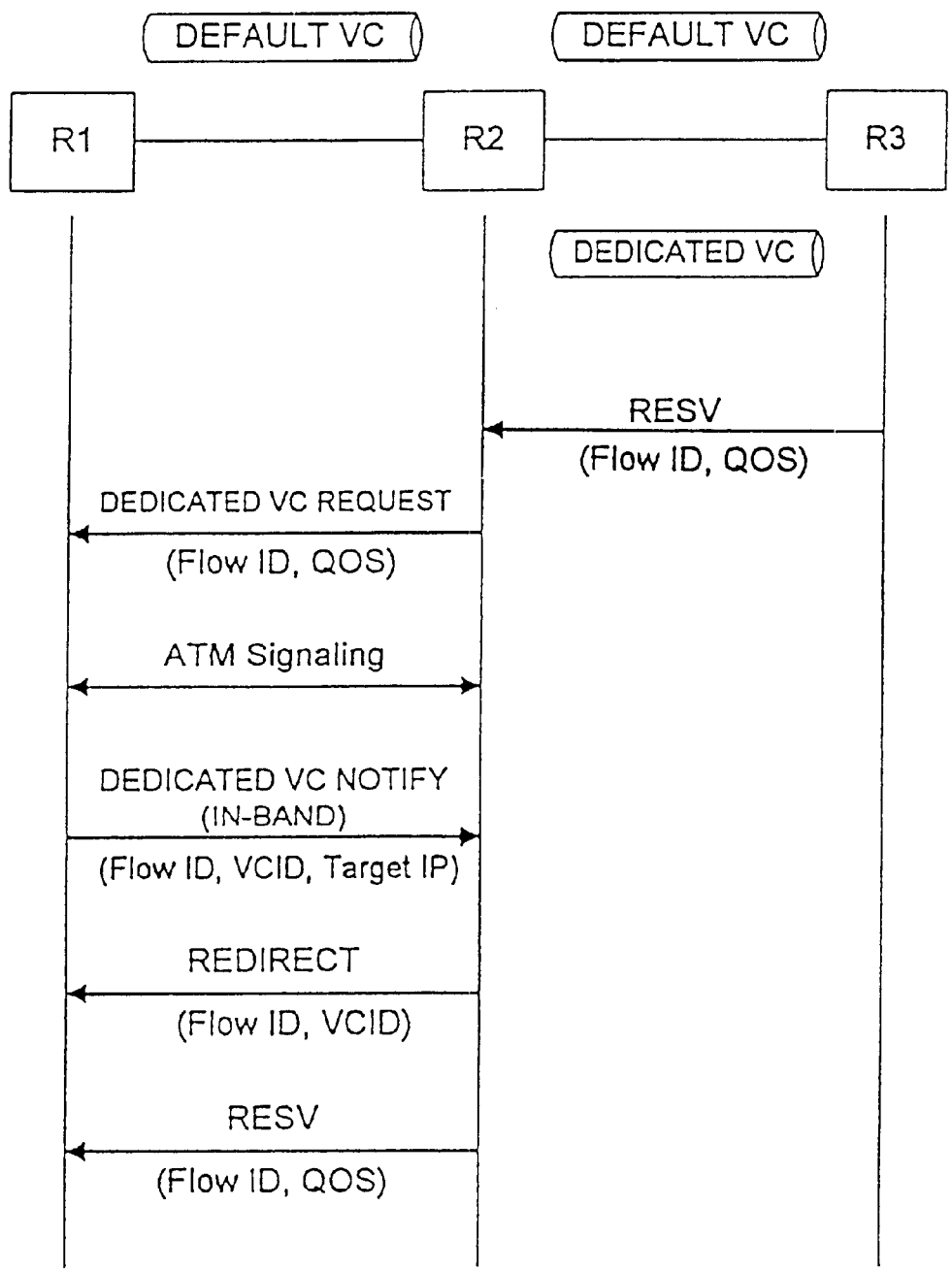
FIG. 6 shows an exemplary initial condition in networks and subsequent message exchanges between routers according to one embodiment of the present invention in case of SVC, unicast, in-band, and upstream dedicated VC set-up.

FIG. 6 shows a message sequence in the in-band case. Flow charts showing an operation of the downstream node can be found in FIG. 4(a) and FIG. 7, and flow charts showing an operation of the upstream node are shown in FIG. 5(c) and FIG. 8.

Differences between the out-band case and the in-band case include dispensing of the VCID propose and VCID ACK messages in the in-band case, and sending the dedicated VC notify message via newly created ATM connection (dedicated VC) also in the in-band case. Also, the dedicated VC notify message in the in-band case includes the target IP address which is included in the VCID propose message in the out-band case, in addition to the Flow ID and the VCID.

Figure 7:
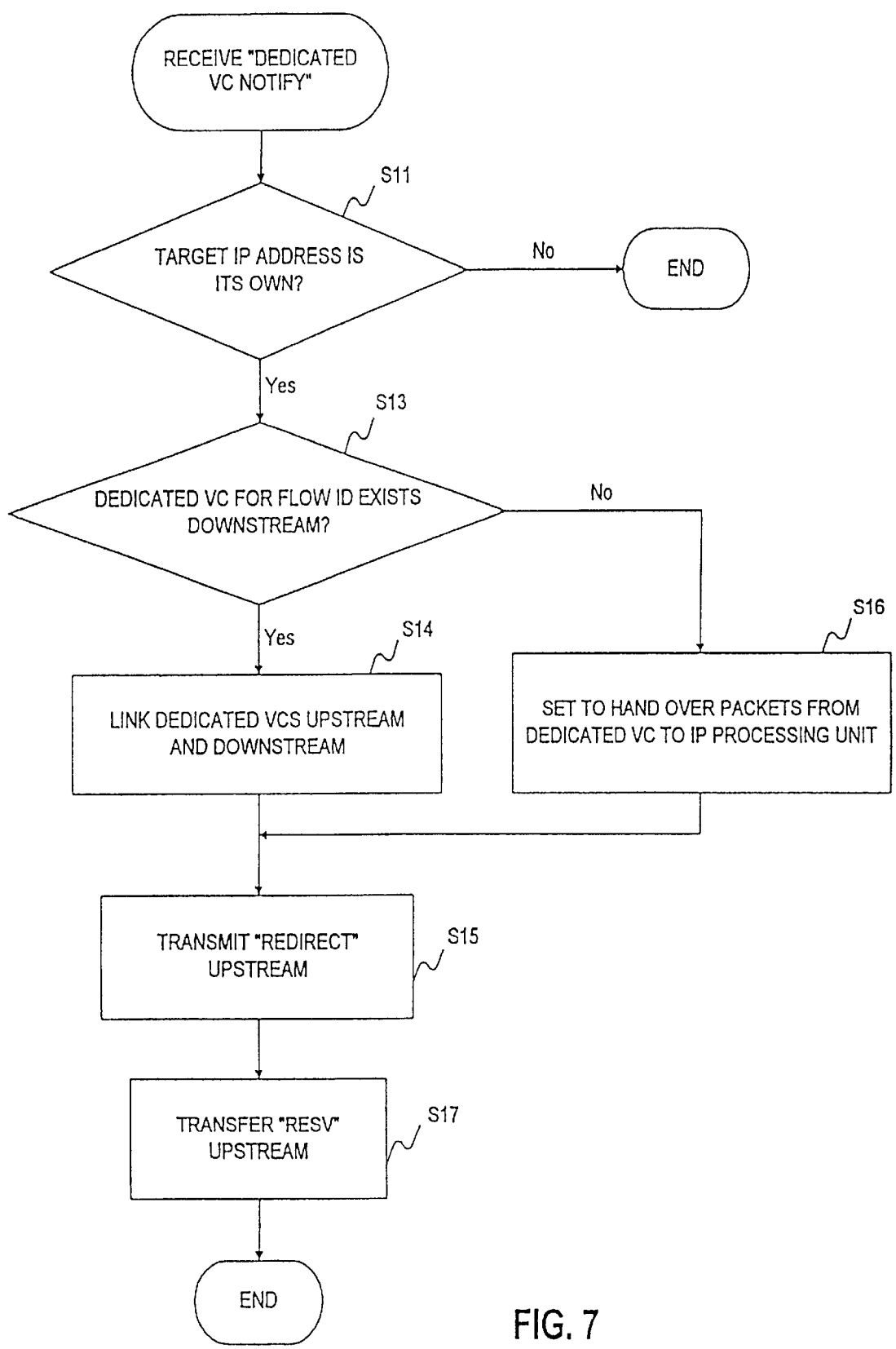
FIG. 7 shows an operation within a downstream router in case shown in FIG. 6.
Figure 8:
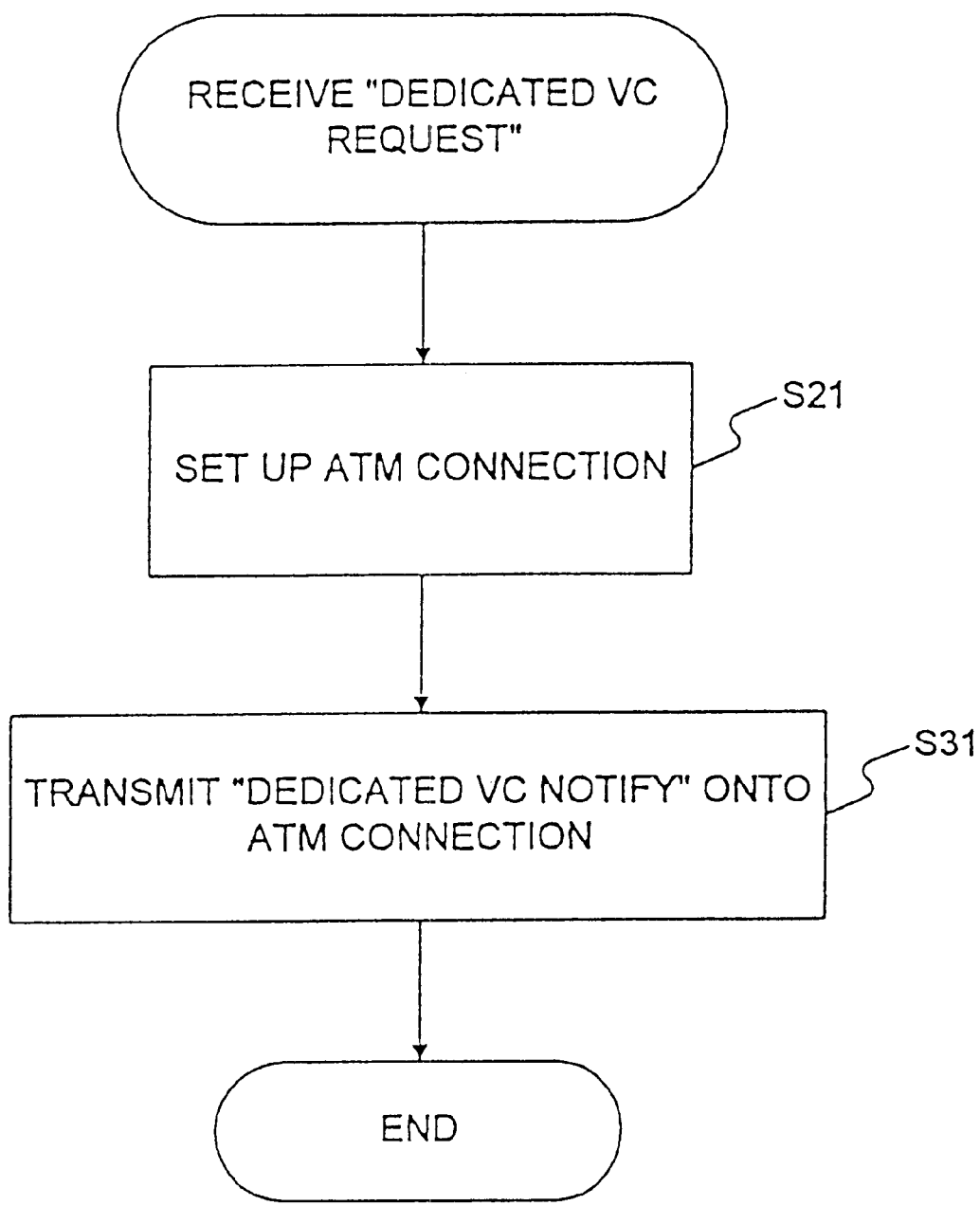
FIG. 8 shows an operation within an upstream router in case shown in FIG. 6.

In eliminating the need for the two messages, the upstream node does not perform step S23 because it does not receive a VCID ACK message, and transmits a dedicated VC notify, rather than a VCID propose, onto the newly created ATM connection (S31), as shown in FIG. 8. The upstream node operates as shown in FIG. 5(c) when a redirect is received. The downstream node operates as shown in FIG. 4(a) when RESV is received. The downstream node does not perform step S12 because it does not receive a VCID propose, and checks whether the target IP address included in the dedicated VC notify is its own address (S11 in FIG. 7) before it operates in the manner illustrated in FIG. 4(c).

(C-2) VP and Unicast

Figure 9:
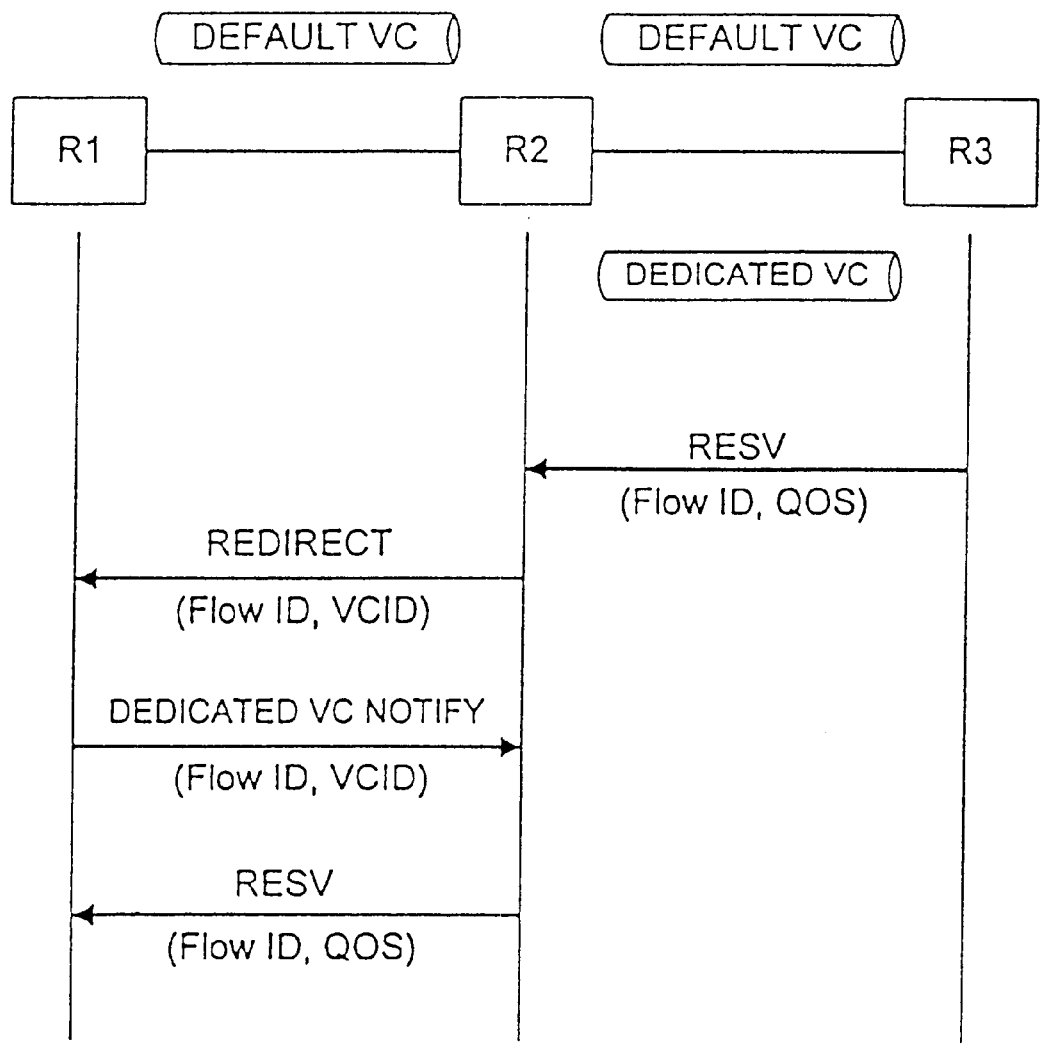
FIG. 9 shows an exemplary initial condition in networks and subsequent message exchanges between routers according to one embodiment of the present invention in case of Virtual Path (VP), unicast, and upstream dedicated VC set-up.
Figure 10A:
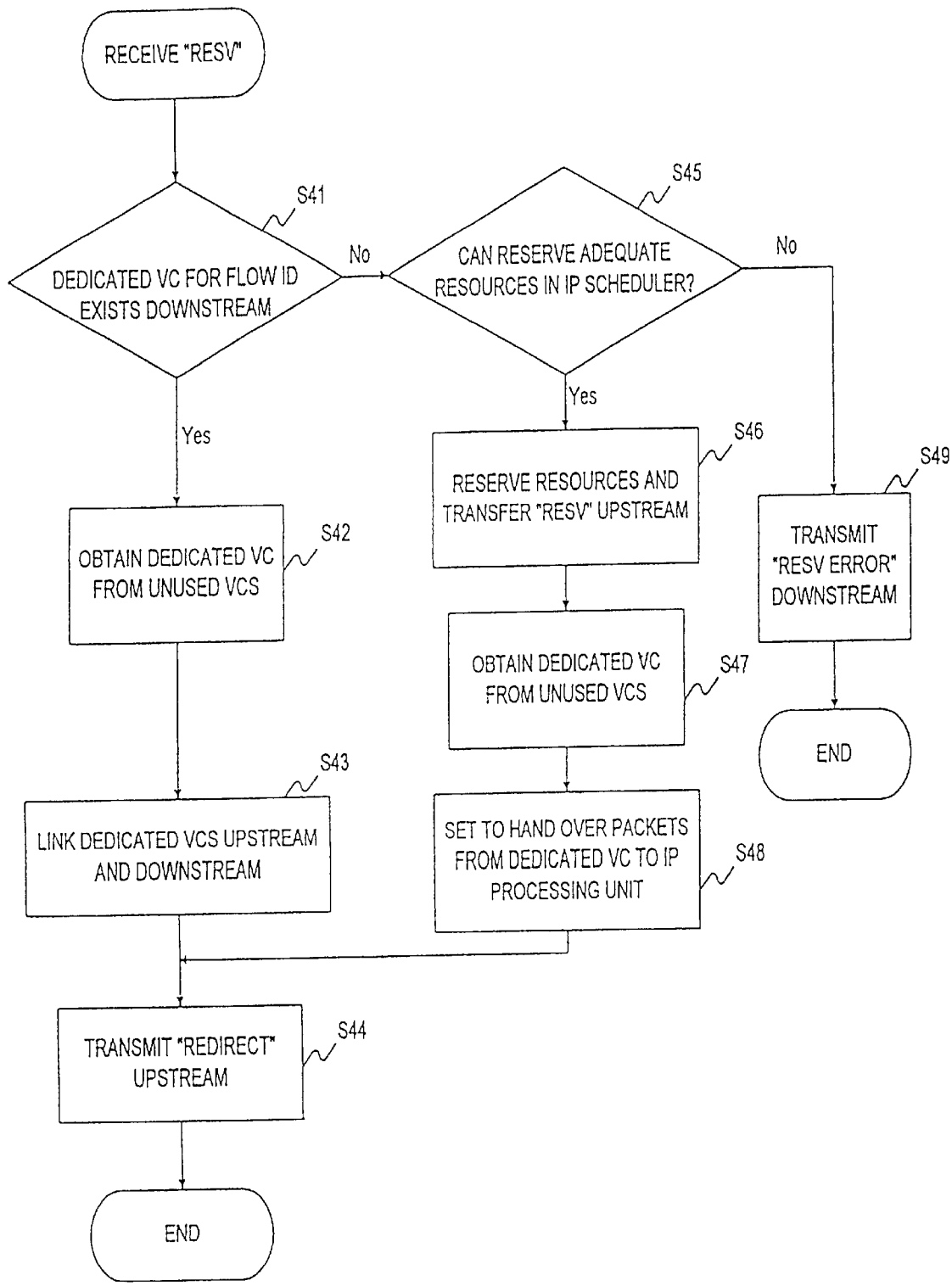
FIGS. 10(a)–10(b) show an operation within a downstream router in case shown in FIG. 9.
Figure 10B:
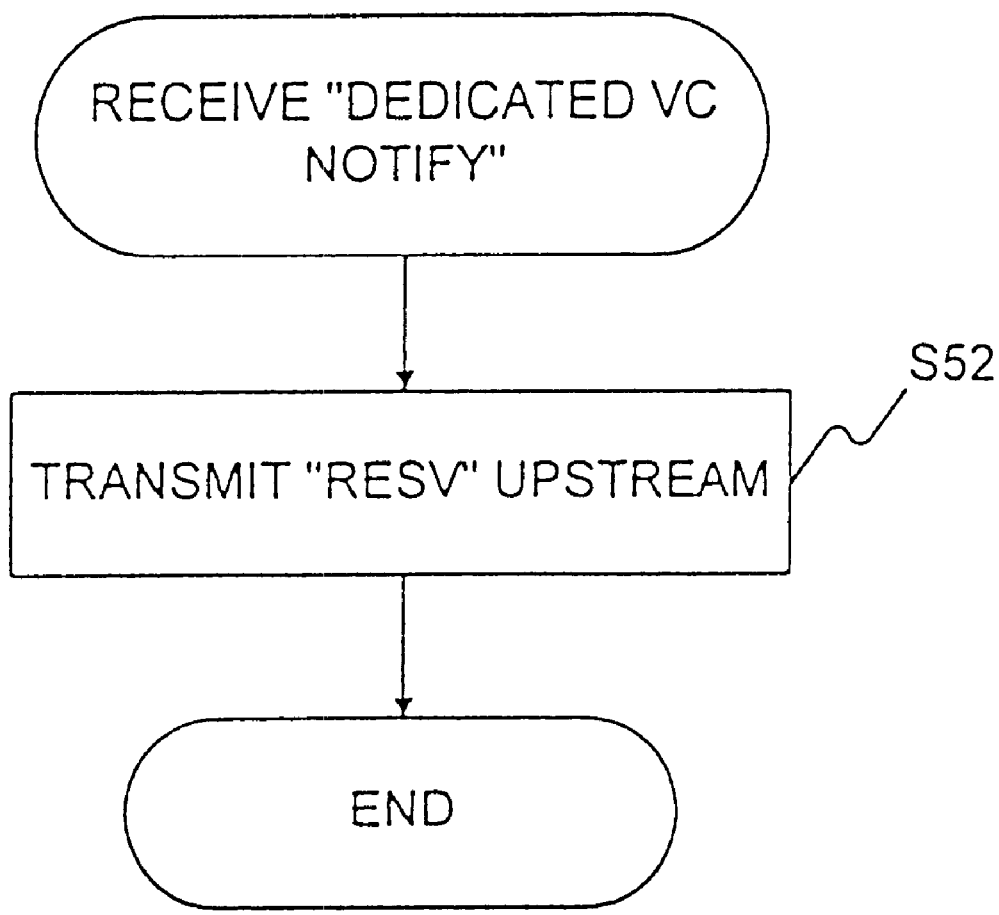
Figure 11:
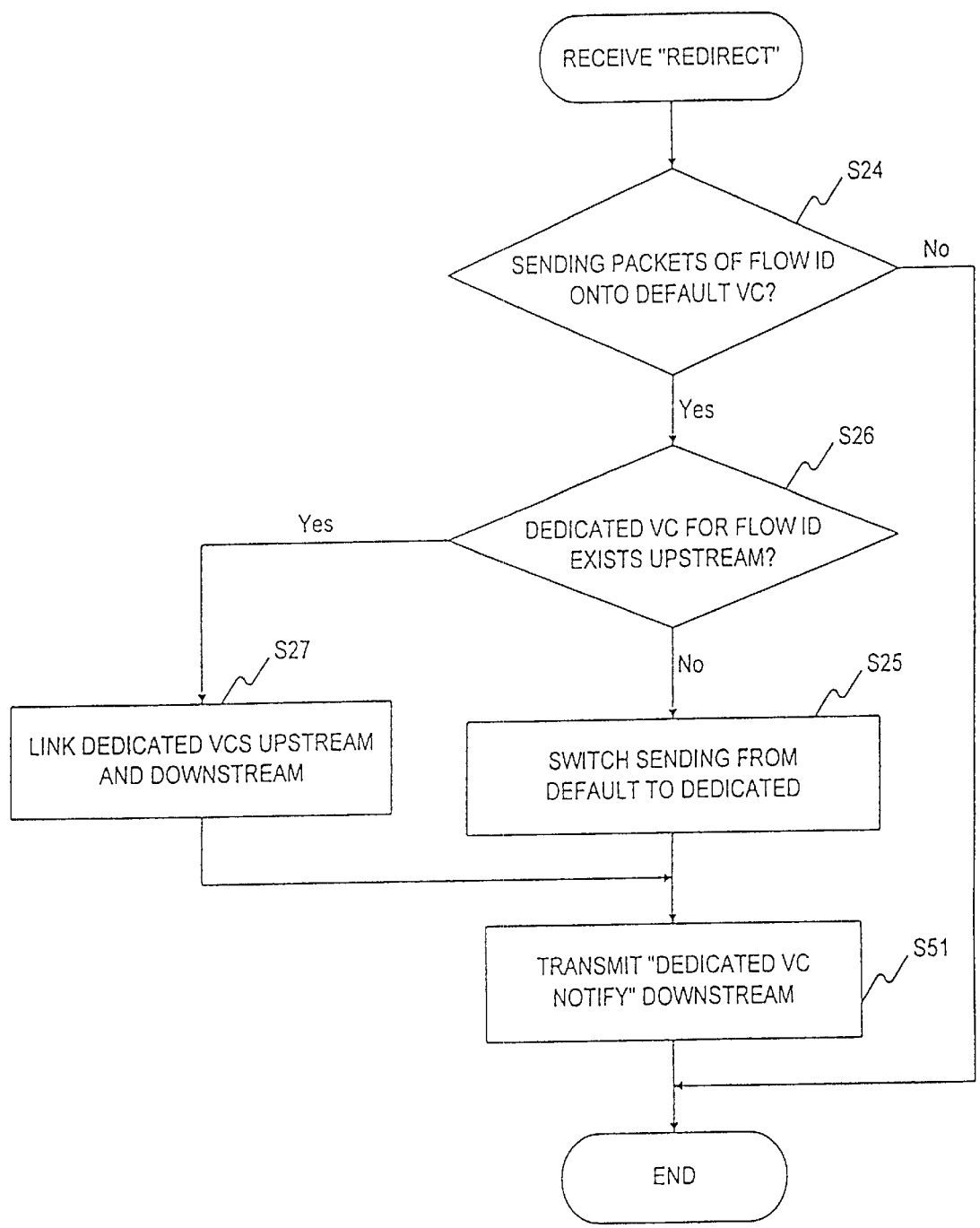
FIG. 11 shows an operation within an upstream router in case shown in FIG. 9.

A method of resource reservation at router R2 will be described when routers R1, R2, and R3 are present as in FIG. 9. As an initial condition, it will be assumed that default VCs from router R1 to router R2 and from router R2 to router R3 are set up, and that a dedicated VC is set up from router R2 to router R3. In this example, the ATM connection is a VP (Virtual Path) connection. FIG. 9 shows message exchanges between routers. FIGS. 10(a)–10(b) show an operation within a router on the downstream side (e.g., R2 in FIG. 9). FIG. 11 shows an operation within an upstream router (e.g., R1 in FIG. 9).

An RSVP reservation (RESV) message from router R3 in FIG. 9 arrives at router R2. The RESV message includes a Flow ID identifying the packet flow for which resources are to be reserved, and a requested QOS.

When router R2 receives the RESV message, in accordance with the flow chart of FIG. 10(a), it checks whether a downstream dedicated VC is set up for the Flow ID specified in the RSVP message (S41). In this example, a dedicated VC is set up, so router R2 selects a suitable upstream dedicated VC from a pool of unused VCs linking R1 to R2 (S42), and links the upstream dedicated VC and the downstream dedicated VC directly (i.e., stores the correspondence relationship of these VCs in an ATM-level routing table) (S43). Router R2 then sends a redirect message by the default VC to the upstream node (R1) (S44). This redirect message includes the VCID information, and the same Flow ID as in the RESV message. For the VCID, a VCI is determined to be used that is not used in VP (VCI of a dedicated VC chosen as above), and the set of VPI/VCI becomes a value of the VCID.

If there is no corresponding dedicated VC on the downstream side, router R2 determines whether the requested resources can be reserved in the IP processing unit (S45). If adequate resources are available, router R2 reserves the necessary resources by scheduling an IP transfer and sends an RESV message upstream (S46). Also, router R2 selects a suitable upstream dedicated VC from a pool of unused VCs from R1 to R2 (S47), and sets an inside routing table to hand over packets received from the upstream dedicated VC to the IP processing unit (S48). Then, a redirect message is sent upstream (S44). If adequate resources are not available, an RESV ERROR message is sent to the downstream node (R3) (S49).

When router R1 receives a redirect message, in accordance with the flow chart of FIG. 11, it changes over the packet transfer with respect to the Flow ID in a similar way as shown in FIG. 5(c) from transfer using the downstream default VC to transfer using the downstream dedicated VC specified in the redirect message, and sends a dedicated VC notify message to the downstream node by the default VC or the dedicated VC (S51). This dedicated VC notify message includes the Flow ID (and the VCID in case of transmitted through the default VC) information.

When router R2 receives the dedicated VC notify message, it operates in accordance with the flow chart of FIG. 10(b). That is, router R2, knowing that the dedicated VC specified by the VCID can be used for the Flow ID exclusively and the QOS request of the RSVP can be satisfied by router R2, sends an RESV message to router R1 through the default VC (S52).

The resource reservation at router R2 is completed as above. The associated dedicated VC is held by sending a redirect message as described above periodically from router R2 to router R1 with appropriate timing. This message for the purpose of holding the dedicated VC can be replaced by the RESV message that is periodically sent upstream. When a router no longer receives a redirect message (or an RESV message if this is used instead), the dedicated VC is released.

The procedure used for a VP case as described above is applicable to a case of using a point-to-point physical link between nodes instead of VP.

(C-3) SVC and Multicast

A method of resource reservation at router R4 will be described when routers R1 through R4 are configured as in FIG. 12. In this example, the ATM connection is SVC in multicast.

Since hosts H2 and H3 are participating in a multicast group G, a default VC of point-multipoint (hereinafter called p-mp) is set up from router R2 to router R3 and R4. This kind of default VC set up for flow of data packets from upstream nodes to downstream nodes is a multicast VC (i.e., can be a p-mp connection). Separately from the above default VC, a point-point (hereinafter called p-p) default VC can be set up for transfer of control packets from a downstream node to an upstream node and/or from an upstream node to a downstream node.

First, the case will be described in which a message notifying a neighboring node of which dedicated VC is used to transfer packets belonging to a given flow is sent in an out-band manner.

Figure 12:
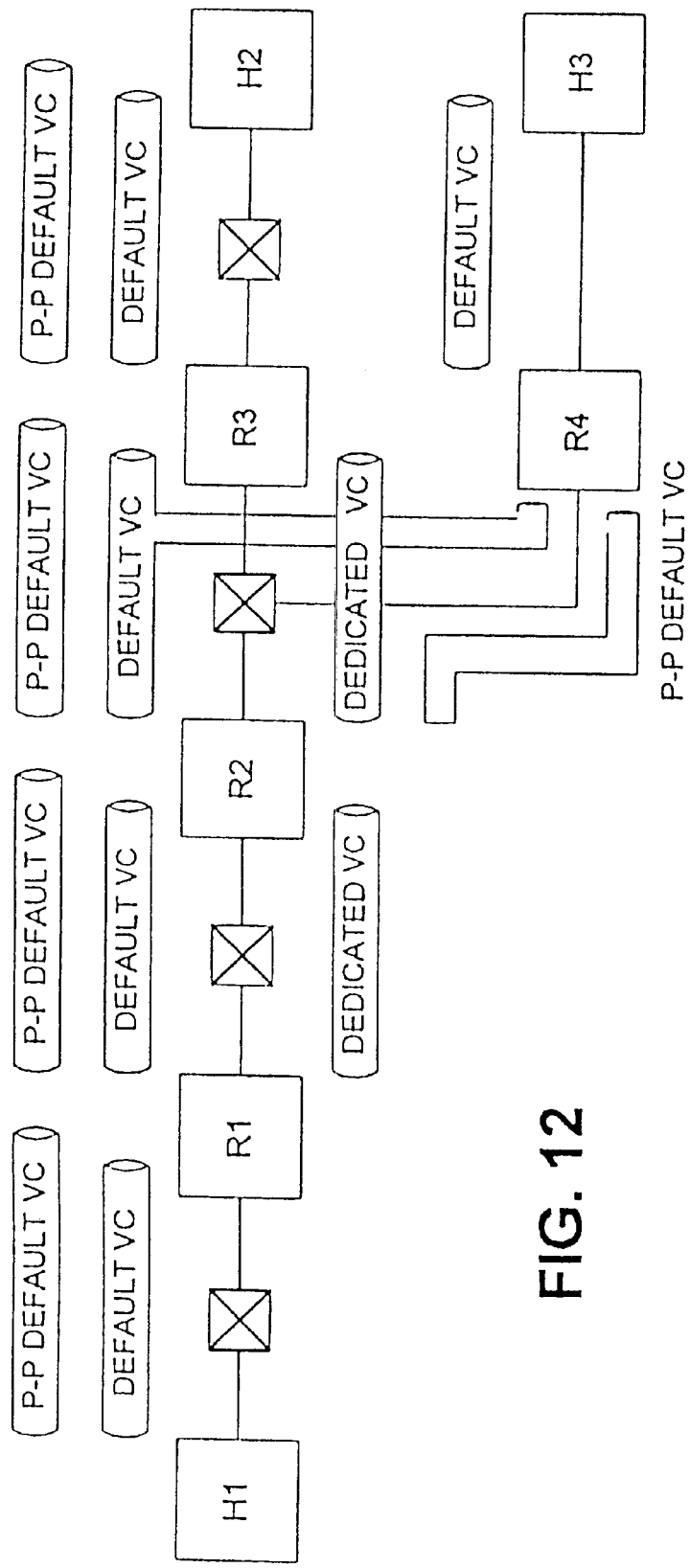
FIG. 12 shows another exemplary network topology in which the embodiments according to the present invention are applied.
Figure 13:
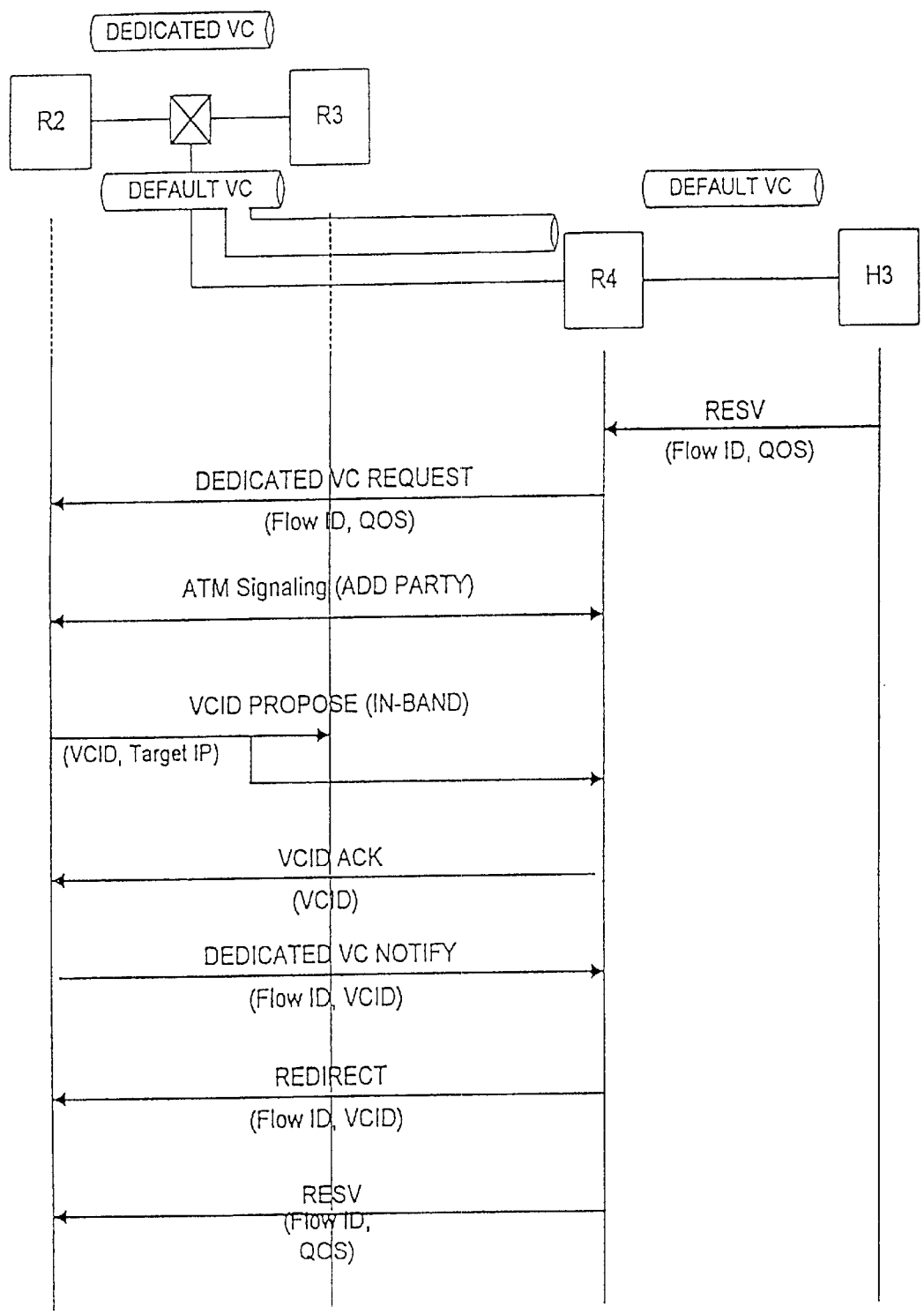
FIG. 13 shows an exemplary initial condition in networks and subsequent message exchanges between routers according to one embodiment of the present invention in case of SVC, multicast, out-band, and upstream dedicated VC set-up.

As shown in FIG. 13, a multicast default VC (i.e. a default VC which can be (in this situation, has already become) a p-mp connection) is set up from router R2 to router R3 and R4, a dedicated VC which can be a p-mp connection is set up from router R2 to router R3, and a default VC (of p-p) is set up between host H3 and router R4. The dedicated VC from router R2 to router R3 is a VC dedicated to multicast group G. In addition, p-p default VCs are set up between routers R2 and R3, and between routers R2 and R4, as shown in FIG. 12.

A dedicated VC from router R1 to router R2 and the dedicated VC from router R to router R3 are set up according to the procedure described in the first half(out-band) of (C-1). In this (C-3), the RESV, VCID ACK, dedicated VC notify, and redirect messages described in (C-1) are sent using the p-p default VC.

A method of resource reservation for packets of multicast group G at router R4 will be described. FIG. 13 shows a view of message exchanges between routers. FIGS. 4(a)–4(c) show an operation within a router on the downstream side also in this case (e.g. R4 in FIG. 13). FIGS. 5(a)–5(c) show an operation within an upstream router also in this case (e.g. R2 in FIG. 13).

An RSVP reservation (RESV) message arrives at router R4 through the default VC from host H3 as in FIG. 13. This RESV message is sent by host H3 in response to the RSVP PATH message transferred downstream using the multicast default VC. The RESV message includes a Flow ID indicating for which packet flow resources are to be reserved, and a QOS requested by a data receiving node.

In accordance with the flow charts of FIGS. 4(a)–4(c), router R4, on receipt of an RESV message, checks for a dedicated VC on the downstream side for a flow of Flow ID in the RESV message (S1). As shown in FIG. 13, no corresponding dedicated VC exists downstream from router R4, so router R4 checks whether the requested resources can be guaranteed by the IP processing unit (S3). If adequate resources are available, a dedicated VC request message is sent to the upstream node R2 (S2). If not, an RESV ERROR message is sent to the downstream node H3 (S4).

If resource reservation is confirmed, in accordance with the flow charts of FIGS. 5(a)–5(c), router R2 that has received the dedicated VC request message sets up an ATM connection (dedicated VC) that satisfies the requested QOS to the node (router R4) that sent the dedicated VC request message, using ATM signaling (S21). The signaling in this case is, for example, ADD PARTY for adding a new leaf to the existing dedicated VC. The new leaf will reach router R4 by branching from a certain switch through which the dedicated VC from router R2 to R3 passes.

When this ATM connection is created, a VCID of this connection is negotiated by the neighboring routers R2 and R3. The VCID could be the same one that determined when the dedicated VC from router R2 to R3 was set up, or could be a new one which is a unique identifier in the logical network to which routers R2 and R4 belong. Router R2 sends a VCID proposal message to the downstream nodes through the ATM connection (dedicated VC) to which the new leaf was added (S22). This message includes the VCID proposed by the source-side router R2 and the target IP address (e.g., IP address of router R4).

Nodes (routers R3 and R4) that receive the VCID propose message checks to ascertain whether the target IP address included in this message matches its own IP address (S11). If so and router R4 approves the proposed VCID, router R4 sends a VCID ACK message through the p-p default VC to the upstream node (router R2) (S12). The VCID ACK message contains at least the VCID proposed by the source-side node and approved by the target node. In this case, since router R4 is the target, a VCID ACK is sent only from router R4 to the upstream node.

Router R2 sends a dedicated VC notify message to router R4, in order to notify router R4 that VCID negotiation has been completed and dedicated VC can now be used (S23). This message is sent through the p-p default VC (i.e., a VC different from the p-mp dedicated VC that is used for sending packets specified by Flow ID). This message includes the Flow ID and the VCID.

Router R4 that has received the dedicated VC notify message knows that the dedicated VC specified by the VCID becomes able to be used exclusively for the flow specified by the Flow ID. Since router R4 finds no downstream dedicated VC for the Flow ID (S13:no), it sets an inside routing table to hand over packets received from the upstream dedicated VC to the IP processing unit (S16). However, if a corresponding dedicated VC is present, router R4 links the upstream dedicated VC and the downstream dedicated VC directly (S14).

Although router R4 has received packets through the p-mp dedicated VC since the new leaf was added to the dedicated VC by ADD PARTY, it may ignore the received packets because it may not know how to handle these packets until the dedicated VC notification message arrives. Router R4 can hand over packets coming through the multicast default VC to the IP processing unit for transfer to host H3, until it has performed the necessary setting on receipt of the dedicated VC notify message.

When the dedicated VC has thus become usable at router R4, a redirect message is sent upstream (S15). This redirect message is sent by the p-p default VC and includes the Flow ID and VCID.

When router R2 receives the redirect message, it takes no action since packets of the Flow ID are already being sent by the dedicated VC (S24:no).

In the case of multicast, the upstream node preferably continues to send packets identified by the Flow ID through the multicast default VC, while it switches the VC used for sending the packets from the default one to the dedicated one at step S25, in order to deal with the possibility that nodes which are receiving packets only through the multicast default VC without requesting cut-through transfer might exist. Such a possibility is more likely to occur when RSVP is used because each receiving party can request a different QOS.

Finally, since the QOS request of RSVP can be satisfied by router R4, router R4 transfers the RESV message through the p-p default VC to router R2 (S17). The order of sending the redirect message in S15 and the RESV message in S17 may be reversed.

The resource reservation at router R4 is completed in the manner described above. The corresponding leaf of the p-mp dedicated VC is held by sending a redirect message periodically from router R4 to router R2 with suitable timing. Regarding the leaf corresponding to router R3, router R3 sends a redirect message to router R2. This redirect message can be replaced by the RESV message that is periodically sent upstream, in order to hold the leaf of dedicated VC. When an upstream node no longer receives a redirect message (or an RESV message substituting for this) from a downstream node, the leaf to that router will be deleted from the p-mp dedicated VC.

Next, the case in which a message notifying a neighboring node of which dedicated VC is used to transfer packets belonging to a given flow is sent in an in-band manner will be described.

With reference to FIG. 13, a dedicated VC from router R1 to router R2 and the dedicated VC from router R2 to router R3 are set up according to the procedure described in the second half (in-band) of (C-1). In this (C-3), the RESV and redirect messages described in (C-1) are sent using the p-p default VC.

Figure 14:
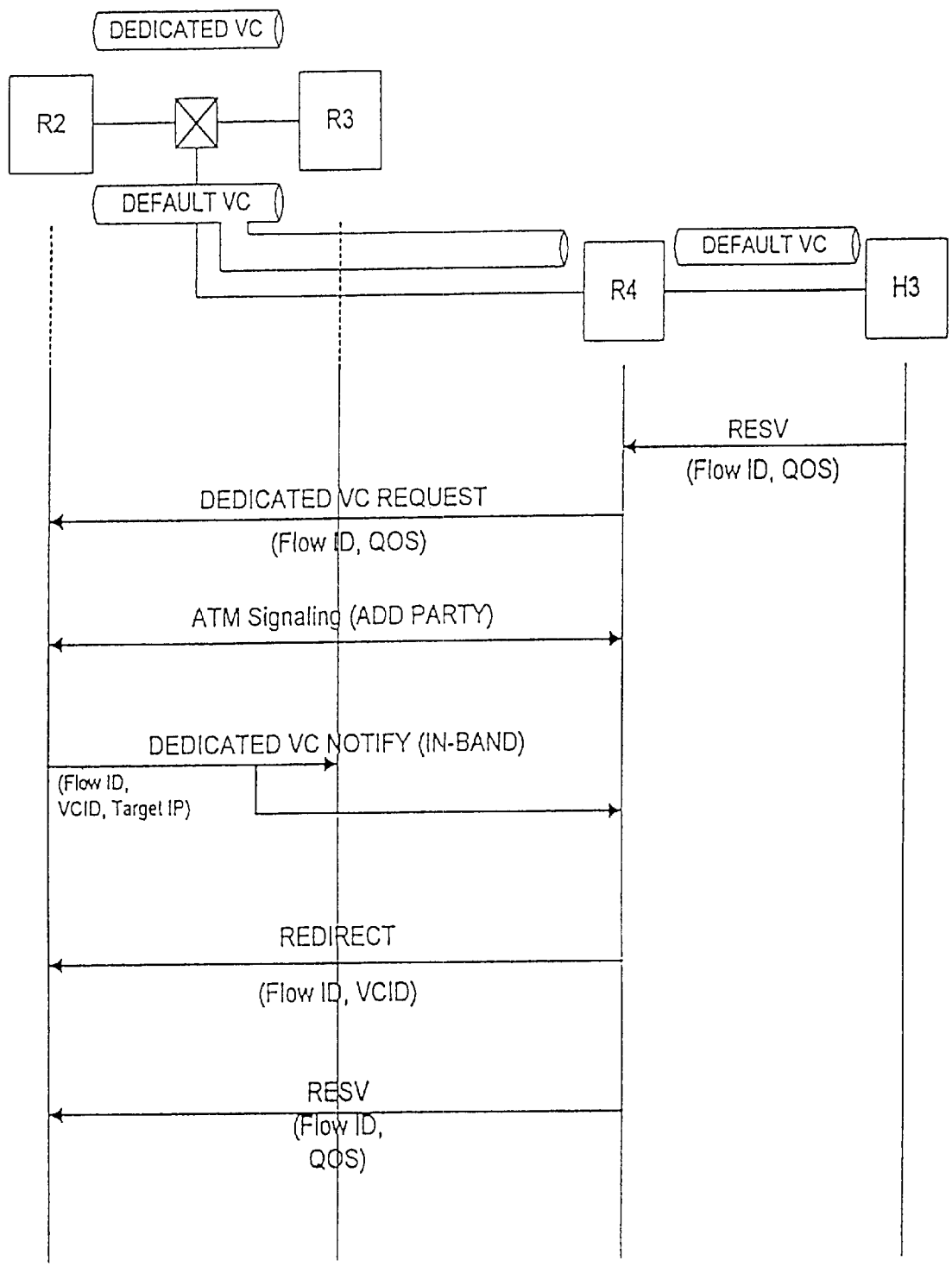
FIG. 14 shows an exemplary initial condition in networks and subsequent message exchanges between routers according to one embodiment of the present invention in case of SVC, multicast, in-band, and upstream dedicated VC set-up.

A method of resource reservation for packets of multicast group G at router R4 will be described. FIG. 14 shows a view of message exchange. FIG. 4(a) and FIG. 7 show an operation within a router on the downstream side also in this case (e.g., R4 in FIG. 14).

FIG. 5(c) and FIG. 8 show an operation within an upstream router also in this case (e.g., R2 in FIG. 14).

The differences from the out-band case for multicast are that, as shown in FIG. 14, the VCID propose and VCID ACK messages are dispensed with, and that the dedicated VC notify message is transferred through the ATM connection (dedicated VC) to which the new leaf has been added. Also, the dedicated VC notify message in the in-band case includes the target IP address, though it is included in the VCID propose message in the out-band case, in addition to the Flow ID and the VCID. This target IP address enables router R3 to ignore the dedicated VC notify message that was picked up also by router R3 but intended for router R4.

Associated with the fact that two messages have been rendered unnecessary, an upstream node does not perform step S23 because a VCID ACK message is not sent, and transmits the dedicated VC notification described above onto the ATM connection with the newly added leaf, instead of the VCID proposal (S31), as shown in FIG. 8. A downstream node operates in the same way as FIG. 4(a) when an RESV message is received, and step S12 on receipt of a VCID propose message is eliminated. When a dedicated VC notify message is received, as shown in FIG. 7, the downstream node operates as shown in FIG. 4(c) after checking whether the target IP address contained in this message is its own address.

D. Implementation of RSVP on CSR in Downstream Direction

Next, another set-up procedure for a dedicated VC, utilizing the CSR technique for RSVP, will be described below. In the embodiments already described above, the procedure sets up a dedicated VC on the upstream side from a node at which an RESV message of RSVP arrived. In contrast, the procedure that will now be described sets up a dedicated VC on the downstream side when an RESV message arrives.

The following three cases provide exemplary situations: 1) an ATM connection is SVC and communication is for unicast; 2) an ATM connection is in a VP or a p-p physical link and communication is for unicast; and 3) an ATM connection is SVC and communication is for multicast.

(D-1) SVC and Unicast

First, the case will be described in which a message notifying a neighboring node of which dedicated VC is used to transfer packets belonging to a given flow is sent in an out-band manner.

Figure 15:
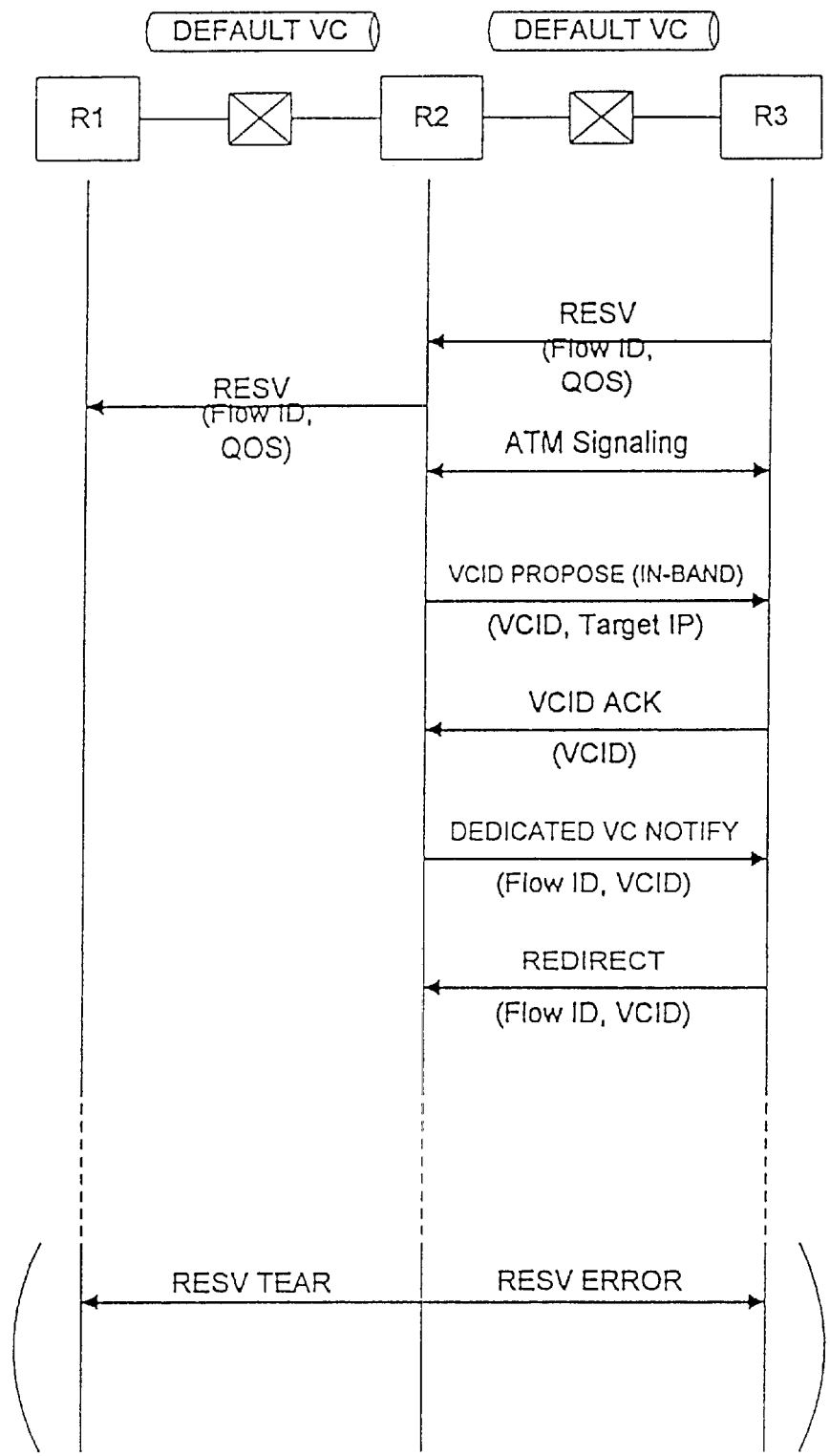
FIG. 15 shows an exemplary initial condition in networks and subsequent message exchanges between routers according to one embodiment of the present invention in case of SVC, unicast, out-band, and downstream dedicated VC set-up.

A method of resource reservation at router R2 will be described when routers R1, R2, and R3 are present as shown in FIG. 15. As an initial condition, default VCs from router R1 to router R2 and from router R2 to router R3 are set up. In this example, the ATM connection is a SVC and communication is unicast. FIG. 15 shows a view of message-exchanges between routers. FIGS. 16(a)–16(d) show an operation within a router on the upstream side (e.g. R2 in FIG. 15). FIGS. 17(a)–17(b) show an operation within an downstream router (e.g. R3 tn FIG. 15).

An RESV message of RSVP arrives at router R2 from router R3 as shown in FIG. 13. The RESV message contains a Flow ID and a requested QOS.

Figure 16A:
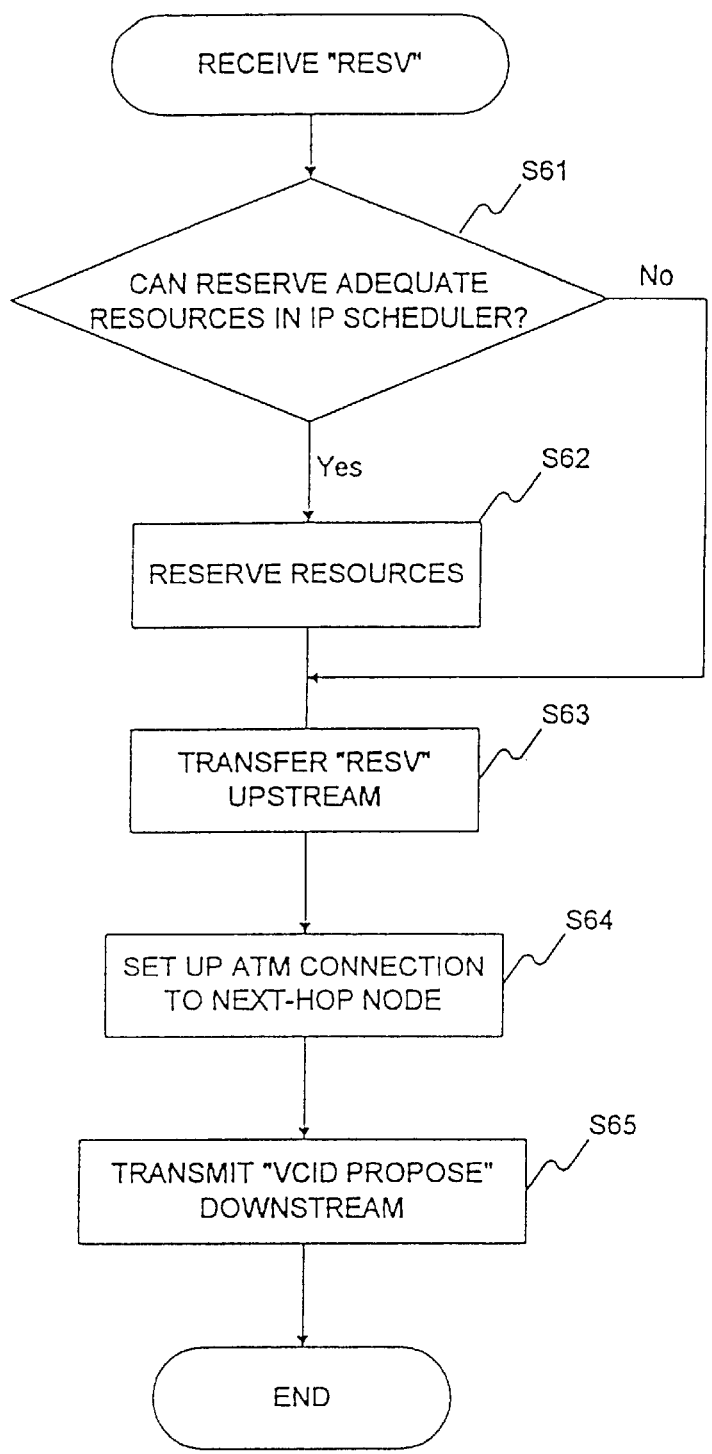
FIGS. 16(a)–16(d) show an operation within an upstream router according to one embodiment of the present invention in case of downstream dedicated VC set-up.
Figure 17A:
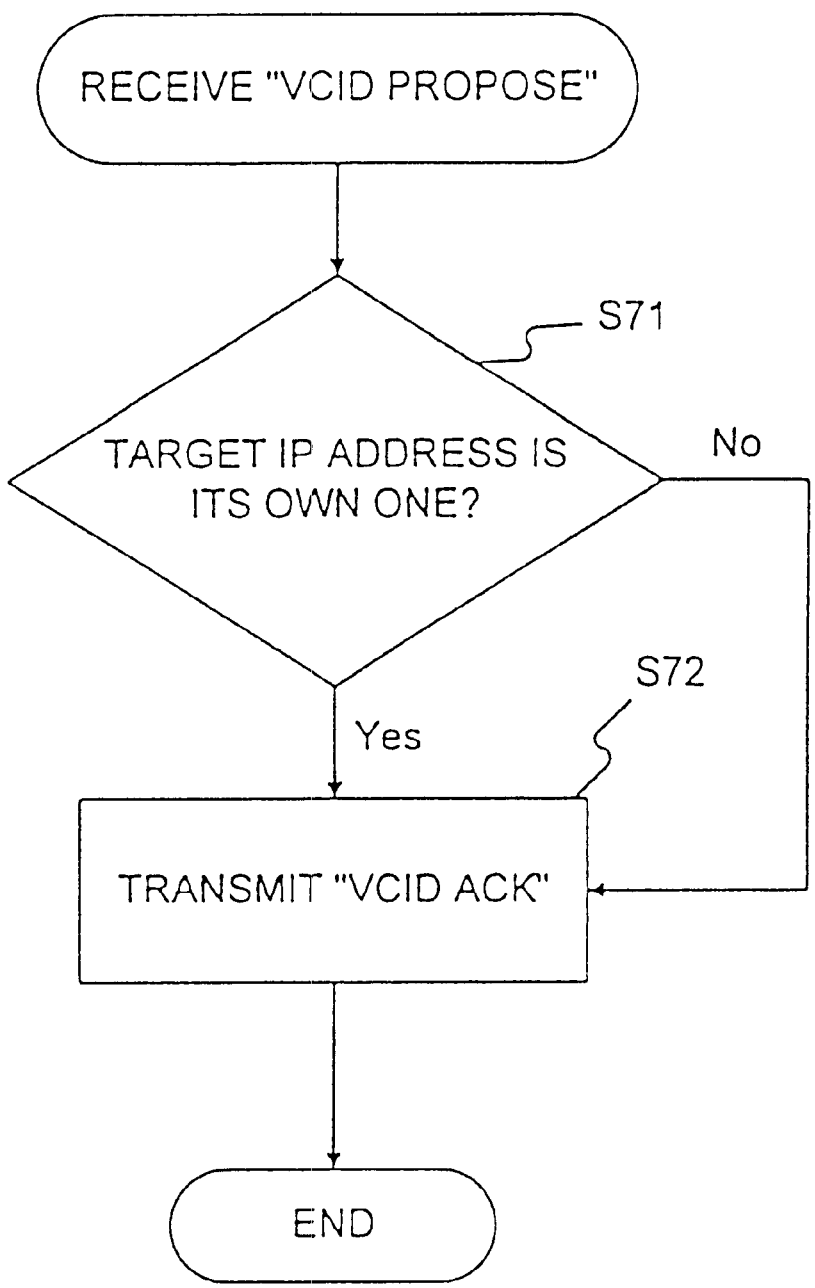
FIGS. 17(a)–17(b) show an operation within a downstream router according to one embodiment of the present invention in case of downstream dedicated VC set-up.
Figure 17B:
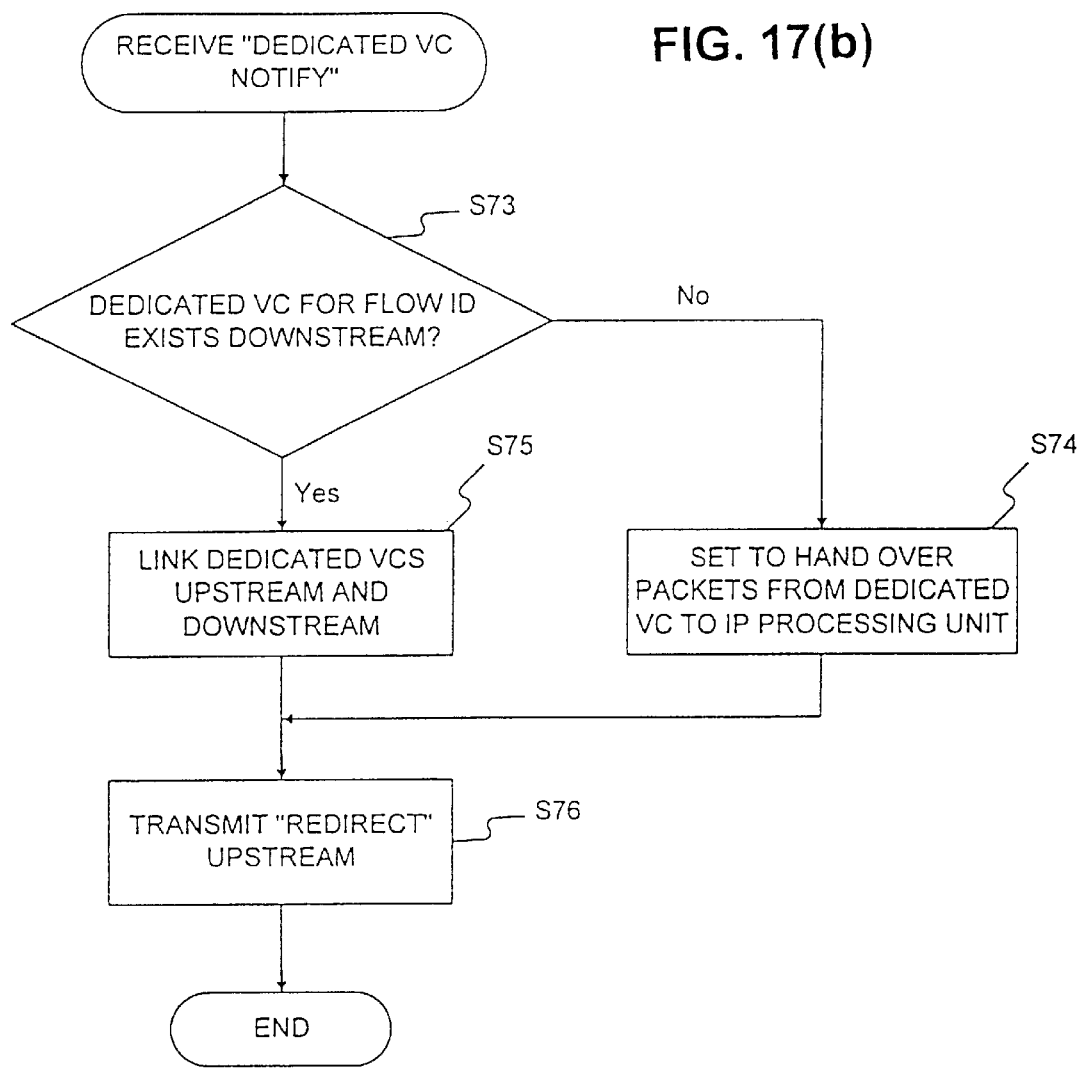

In accordance with the flow chart of FIG. 16(a), router R2 checks whether the resources satisfying the requested QOS can be reserved in the IP processing unit (S61). If adequate resources are available, router R2 reserves the resources in the IP scheduler (S62), and transfers an RESV message upstream (to router R1) through the default VC (S63). Even if adequate resources are not available, router R2 transfers an RESV message upstream (S63) in anticipation that the requested QOS may later be satisfied by linking, at a lower layer than IP, an upstream dedicated VC and a downstream dedicated VC, both of which may be created later.

After router R2 transfers the RESV message, it operates to set up a dedicated VC on the downstream side (to router R3). This order can be reversed. Namely, router R2 may transfer the RESV message upstream after setting up the dedicated VC on the downstream side (e.g., after a redirect message has been returned from router R3).

It is preferable to set up a dedicated VC on the downstream side, even if adequate resources can be reserved in the IP scheduler, in order to enable other packet flows to use IP scheduler resources. That is, if it becomes subsequently possible to reserve resources for this packet flow by an ATM switching function (e.g., by linking created dedicated VCs of upstream side and of downstream side), utilizing this switching function rather than the IP scheduling may increase the margin found in the IP scheduler resources.

As shown in FIG. 14(a), to set up a downstream dedicated VC, router R2 creates an ATM connection that satisfies the requested QOS to the next-hop node (router R3) by ATM signaling (S64), and then sends a VCID propose message onto this ATM connection (dedicated VC) (S65).

In accordance with FIG. 17(a), a downstream node (router R3) that has received the VCID propose message checks to ascertain whether the target IP address included in this message is its own IP address (S71). If so and router R3 approves the proposed VCID, router R3 sends a VCID ACK message through the default VC to the upstream node (router R2) (S72).

Figure 16B:
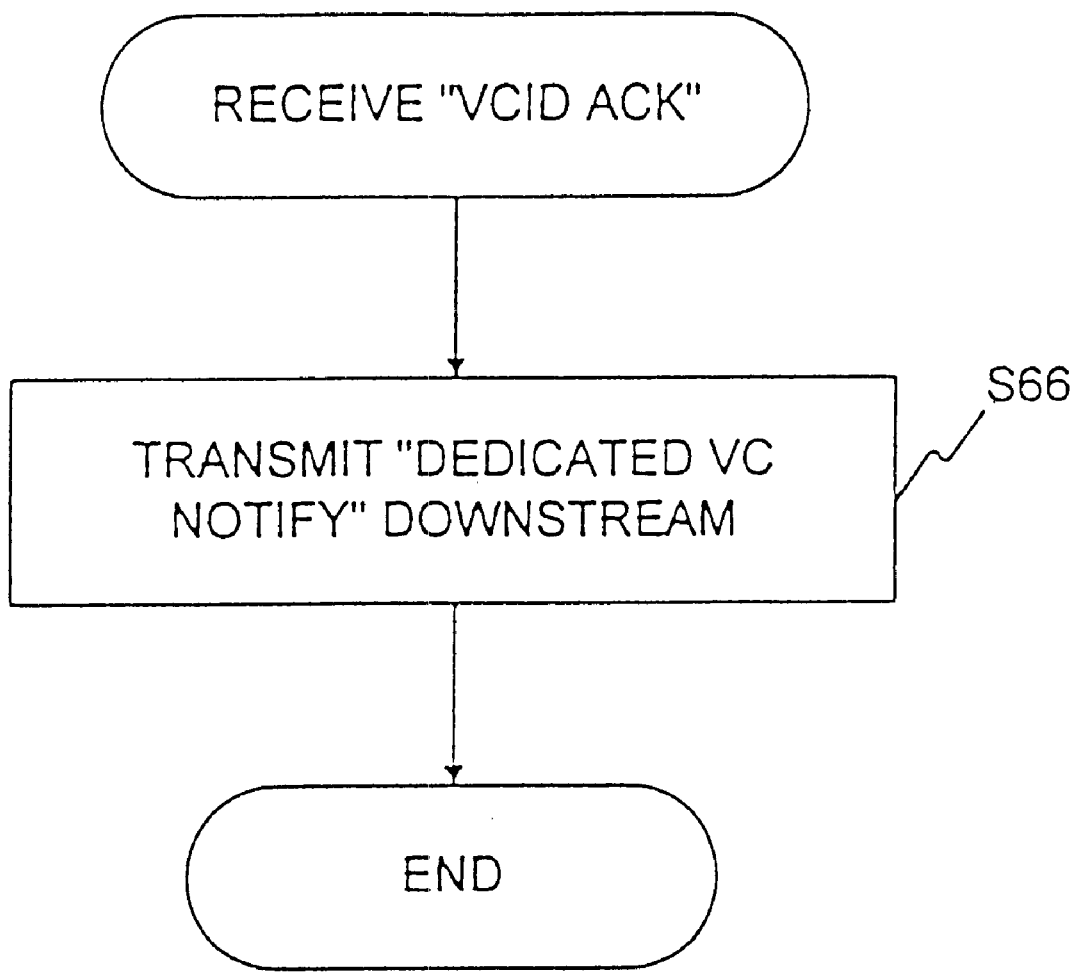

In accordance with FIG. 16(b), an upstream node (router R2) that has received the VCID ACK message sends a dedicated VC notify message downstream by the default VC (S66).

In accordance with FIG. 17(b), a downstream node (router R3) that has received the dedicated VC notify message checks whether a dedicated VC downstream (to host H2) having the same Flow ID as included in this message exists (S73). If not, router R3 sets an inside routing table to hand over packets received from the upstream dedicated VC (from router R2) to the IP processing unit (S74). If so, router R3 links the upstream dedicated VC and the downstream dedicated VC directly (S75). Then, router R3 sends a redirect message to the upstream node (router R2) by the default VC, to let the upstream node confirm that the dedicated VC has become usable at router R3 (S76).

Figure 16C:
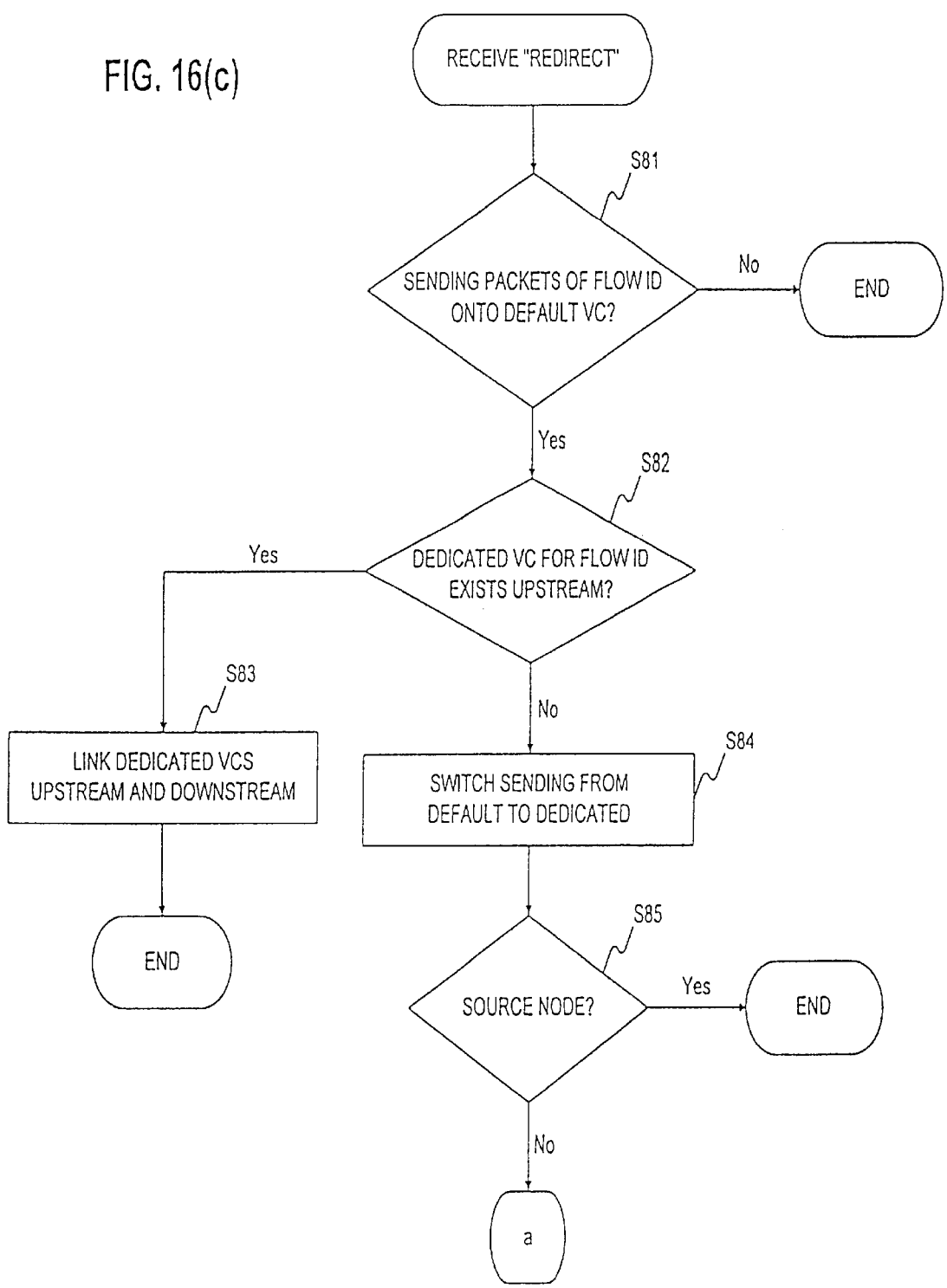
Figure 16D:
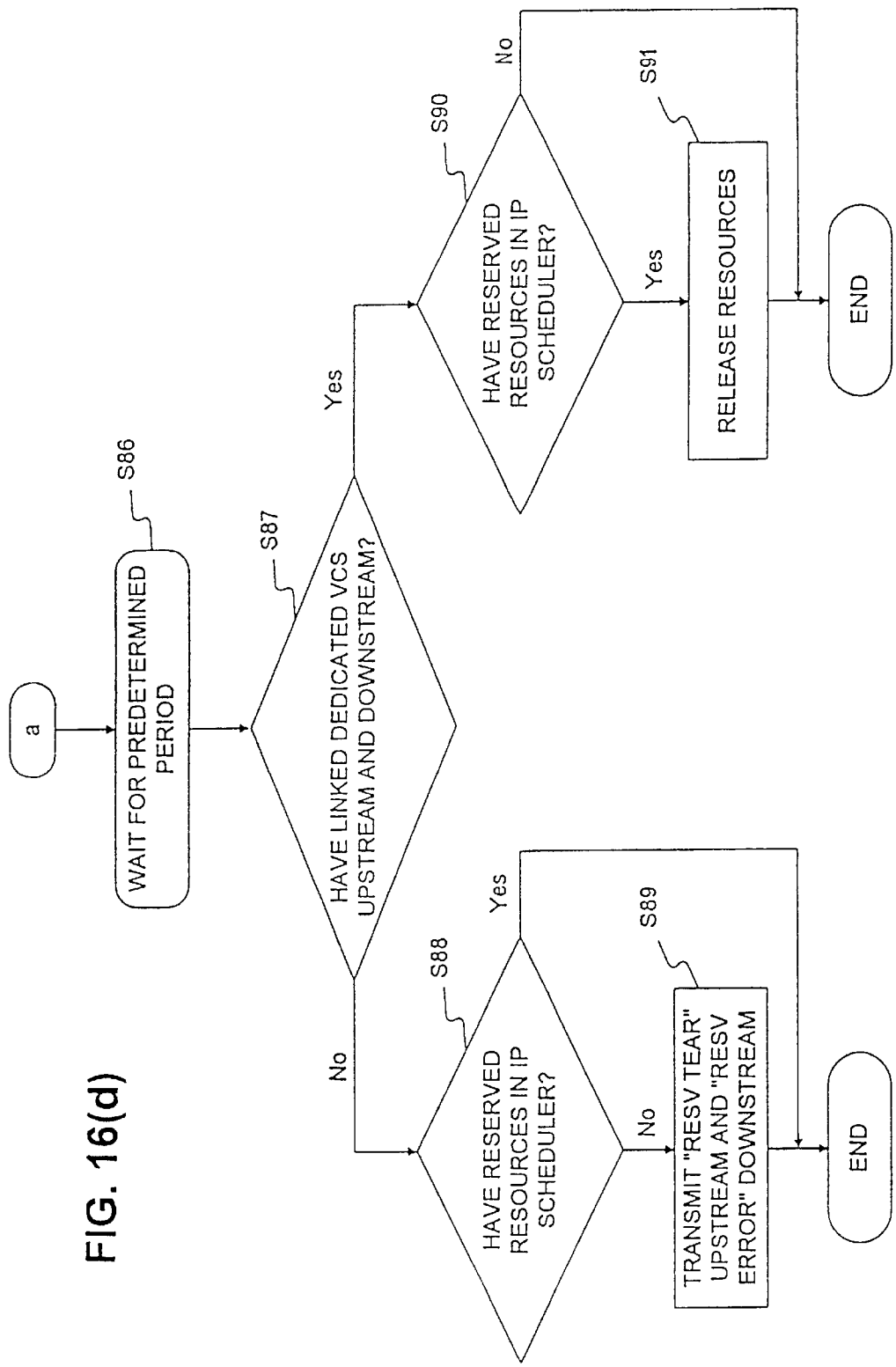

In accordance with FIGS. 16(c) and 16(d), an upstream node (router R2) that has received the redirect message checks whether packets of the Flow ID included in this message are still being sent onto the default VC (S81). If not (e.g., because the packets have already been transferred onto the dedicated VC when a new leaf is added in the multicast case), router R2 finishes the procedure.

If packet transfer onto the dedicated VC is not effected, router R2 checks whether a dedicated VC on the upstream side (from router R1) having the same Flow ID (S82). If so, router R2 links the upstream dedicated VC and the downstream dedicated VC (to router R3) directly (S83). If not, router R2 sets its IP processing unit to send packets of this Flow ID onto the dedicated VC (S84).

If router R2 transmits packets of this Flow ID from its own upper layer, without receiving them from another upstream node (S85:yes), the procedure ends. Also in a case where router R2 is a starting point of a cut-through connection (e.g., a further upstream node does not adopt the CSR technique), though router R2 transfers packets received from another node, the procedure terminates.

Otherwise, router R2 waits for an upstream dedicated VC for the same Flow ID being set up (S86). If this does not happen or the upstream and downstream dedicated VCs are not directly linked while router R2 is waiting for a predetermined period (S87:no), router R2 checks whether or not resources have been reserved in the IP scheduler by step S62 (S88). If reserved, router R2 finishes the procedure. If not reserved, router R2 sends an RESV TEAR message upstream (to router R1) to cancel the RESV message sent by step S63, and sends an RESV ERROR message downstream (to router R3) to indicate that the resource reservation has failed. In one embodiment, router R2 may check again whether adequate resources can be reserved in the IP scheduler, and to reserve adequate resources if possible, at step S88, in order to decrease the risk of reservation failure.

On the contrary, if dedicated VCs having the same Flow ID have been set up on the upstream and downstream sides respectively and those dedicated VCs are directly linked within a fixed time (S87:yes), router R2 checks whether resources have been reserved in the IP scheduler by step S62 (S90). If not reserved, router R2 finishes the procedure. If reserved, router R2 releases the once reserved resources (S91), because these resources have become unnecessary, due to the direct linkage of the dedicated VCs.

The resource reservation at router R2 is completed as described above. The dedicated VC between routers R2 and R3 is held by sending a redirect message periodically from router R3 to router R2 with suitable timing. The RESV message that is periodically sent upstream can replace the redirect message. When a redirect message (or an RESV message in case of the replacement) has ceased to be received from a downstream node, the dedicated VC will be released from the dedicated use of the packet flow identified by the Flow ID.

In the above example, resources in the IP scheduler are reserved first, and then, if dedicated VCs are set up and linked, the reserved resources are released. However, especially in a case where a probability of set-up and linkage of the dedicated VCs is high, a router can set up a dedicated VC on the downstream side without resource reservation in the IP scheduler and to wait for a dedicated VC on the upstream side setting up. In this case, if an upstream dedicated VC is set up, the router links the dedicated VCs and finishes the procedure. After the router finds that an upstream dedicated VC is not set up at step S87, it tries resource reservation in the IP scheduler. If the reservation does not succeed, the router sends an RESV Tear message upstream and an RESV ERROR message downstream.

Next, the case will be described in which a message notifying a neighboring node of which dedicated VC is used to transfer packets belonging to a given flow is sent in an in-band manner.

In the procedure of out-band described above, three messages (VCID propose, VCID ACK, and dedicated VC notify) are transmitted after performing ATM signaling. However, the VCID propose and VCID ACK messages may be dispensed by allowing the dedicated VC notify message to flow onto the newly created ATM connection (dedicated VC).

Figure 18:
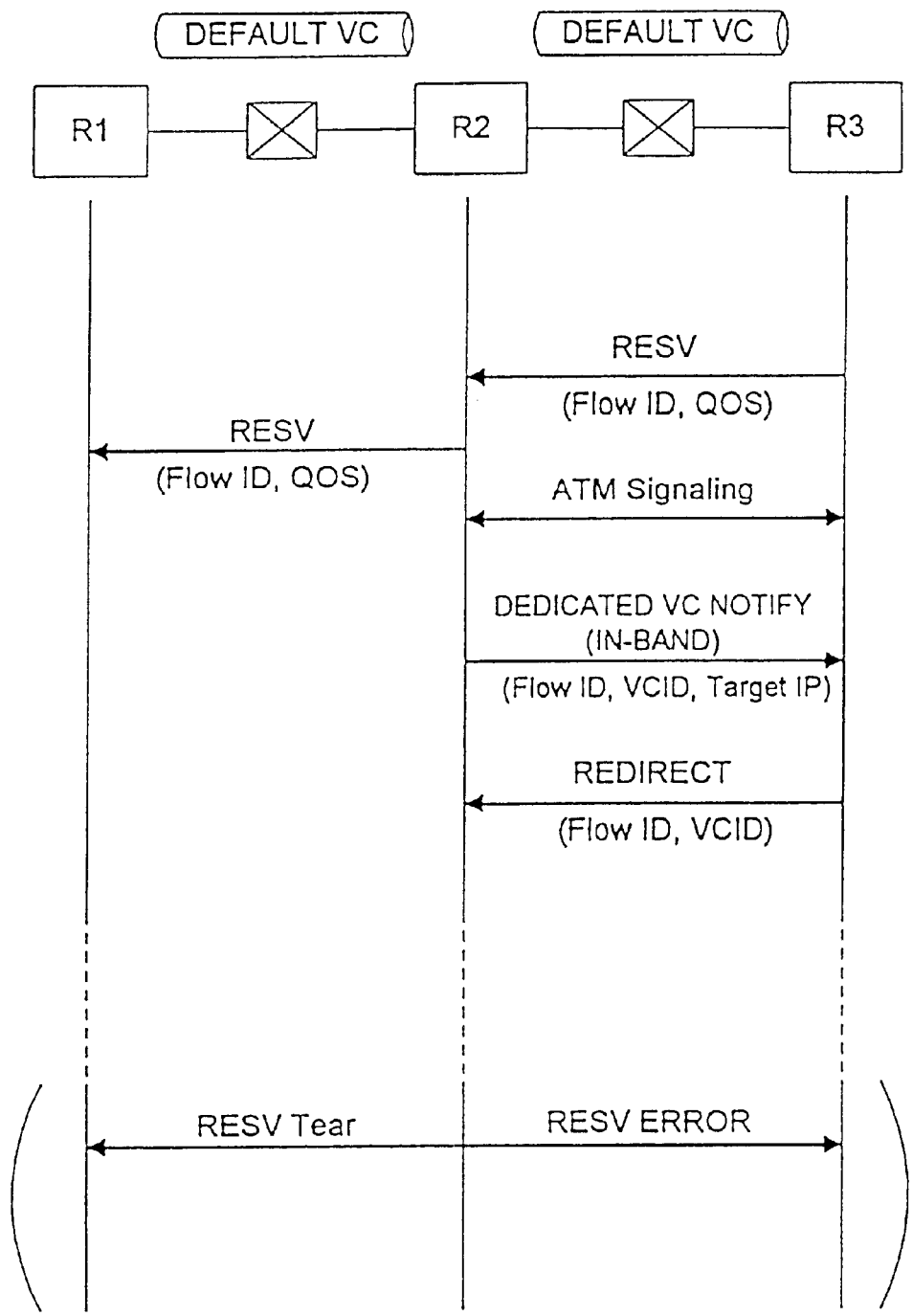
FIG. 18 shows an exemplary initial condition in networks and subsequent message exchanges between routers according to one embodiment of the present invention in case of SVC, unicast, in-band, and downstream dedicated VC set-up.

FIG. 18 shows a message sequence in this case. Flow charts showing an operation of the upstream node are contained in FIGS. 16(c) and 16(d) and FIG. 19, and a flow chart showing an operation of the downstream node is shown in FIG. 20.

The aspects changed from the out-band case to the in-band case are that the VCID propose and VCID ACK messages have been dispensed with, and that the dedicated VC notify message is sent by the newly created ATM connection (dedicated VC). Also, the dedicated VC notify message in the in-band case includes the target IP address which is included in the VCID propose message in the out-band case, in addition to the Flow ID and the VCID.

Figure 19:
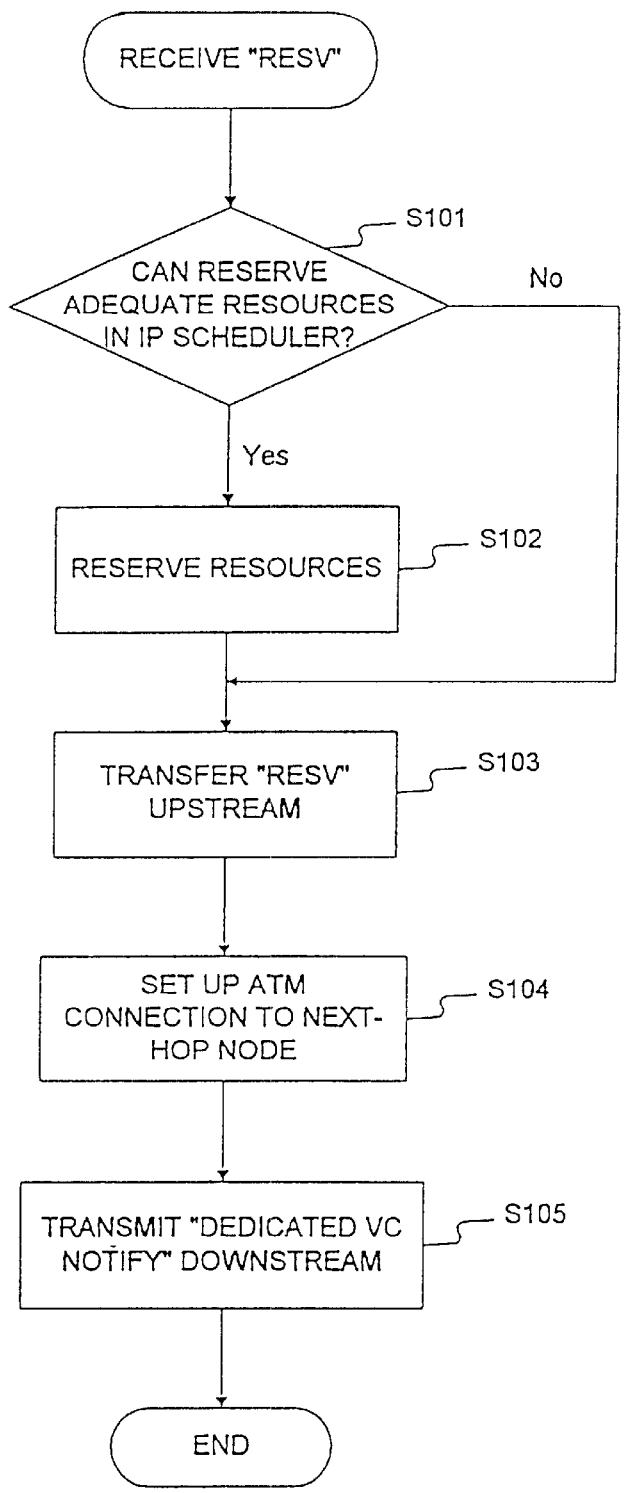
FIG. 19 shows an operation within an upstream router in case shown in FIG. 18.
Figure 20:
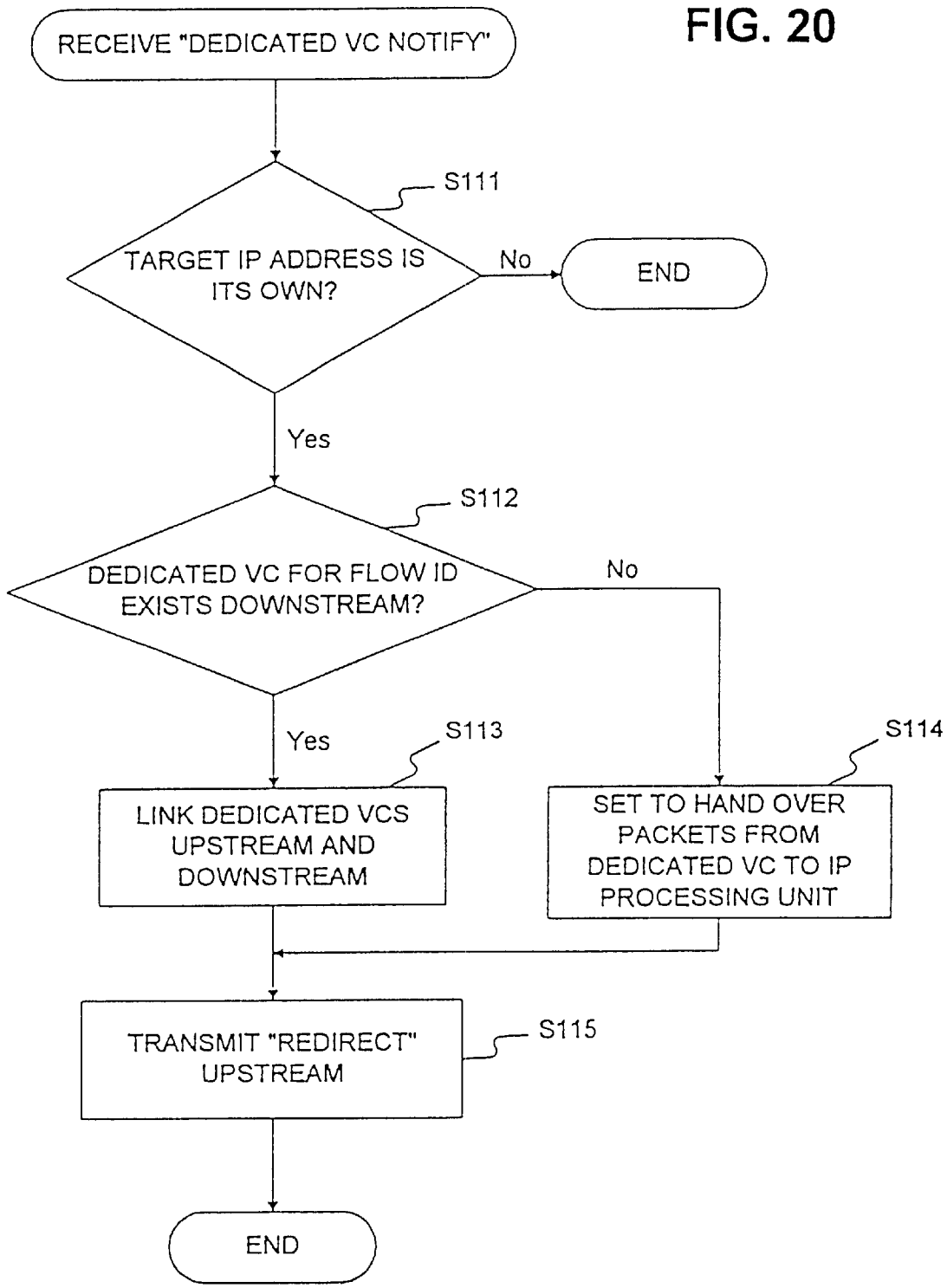
FIG. 20 shows an operation within a downstream router in case shown in FIG. 18.

Associated with eliminating the two messages, the upstream node does not perform step S66 because it does not receive a VCID ACK message, and transmits a dedicated VC notify, rather than a VCID propose, onto the newly created ATM connection (S105), as shown in FIG. 19. The upstream node operates as shown in FIGS. 16(c) and 16(d) when a redirect is received. The downstream node does not perform step S72 because it does not receive a VCID propose, and, as shown in FIG. 20, checks whether the target IP address included in the dedicated VC notify is its own address (S111) before it operates as shown in FIG. 17(b).

(D-2) VP and Unicast

Figure 21:
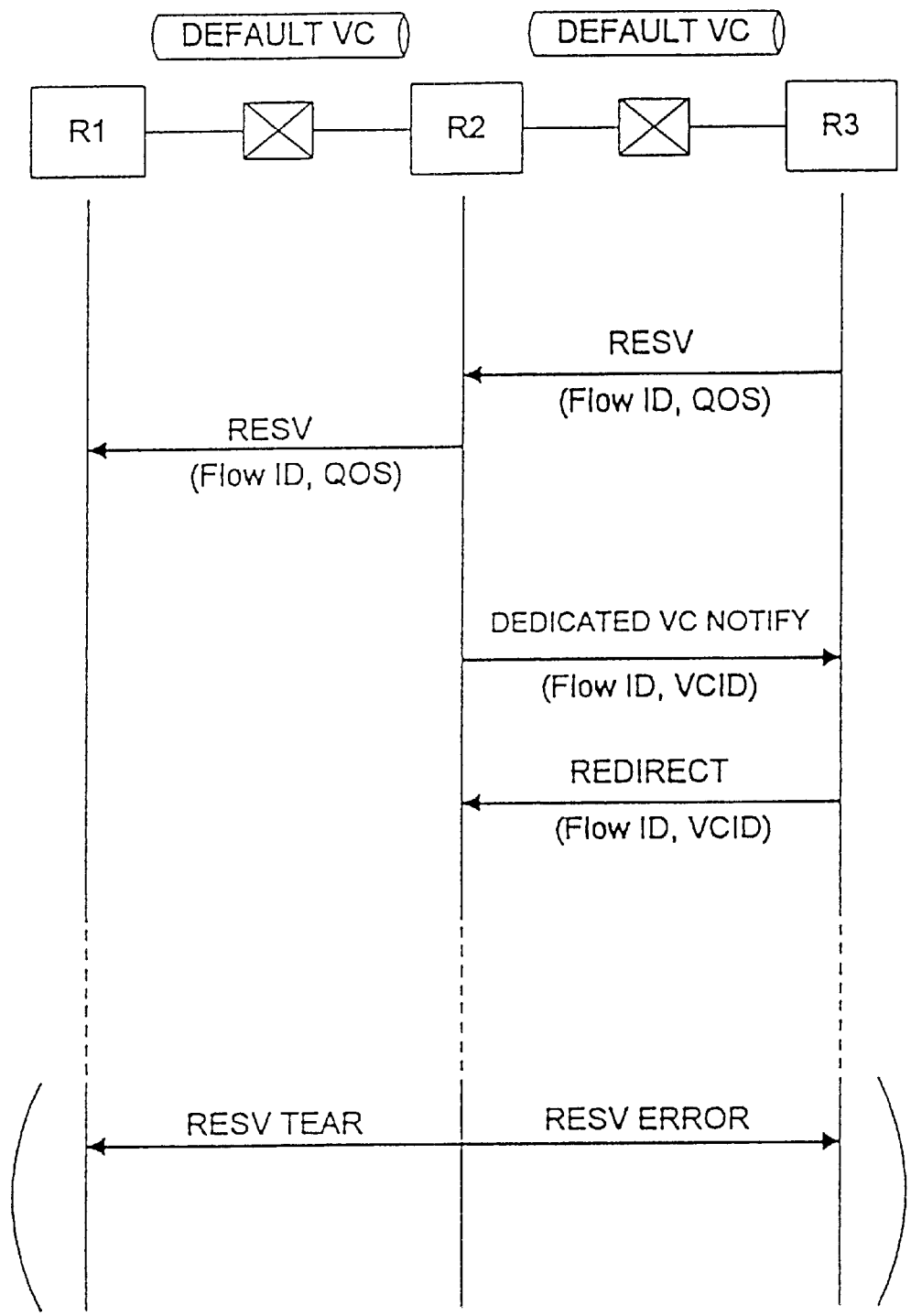
FIG. 21 shows an exemplary initial condition in networks and subsequent message exchanges between routers according to one embodiment of the present invention in case of VP, unicast, and downstream dedicated VC set-up.
Figure 22:
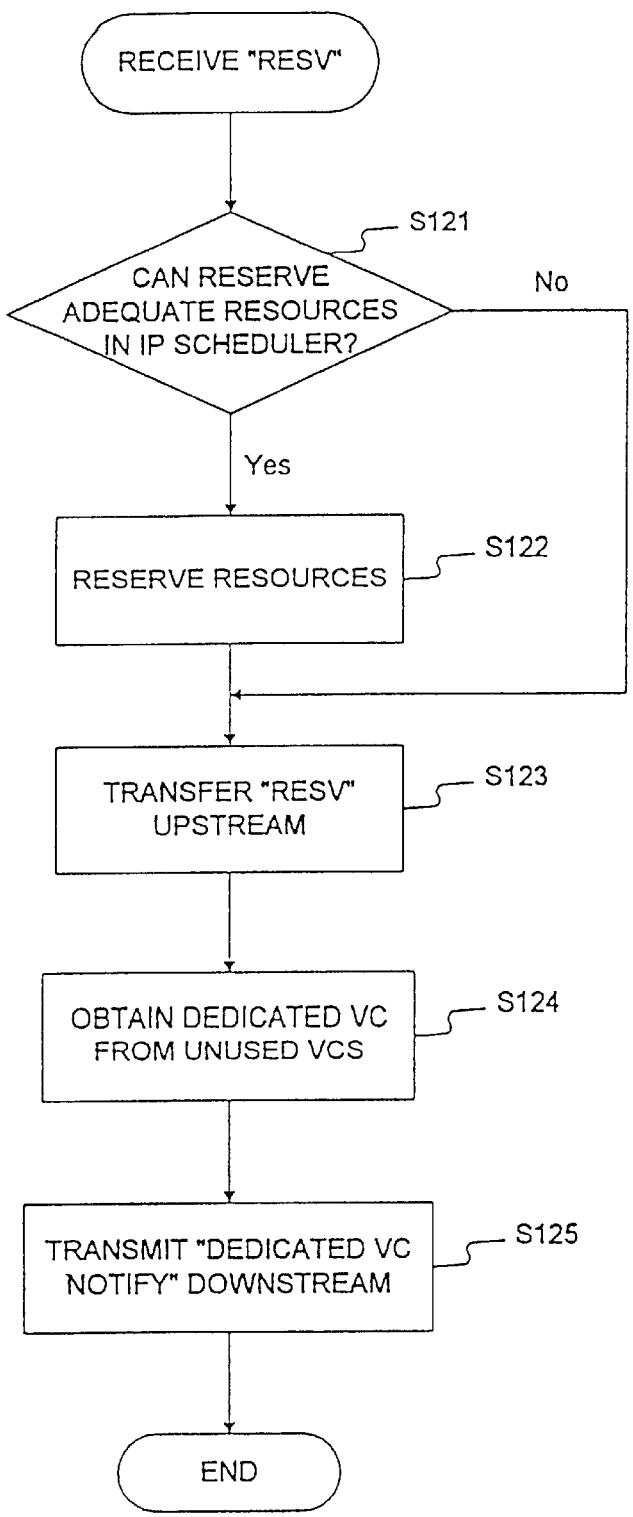
FIG. 22 shows an operation within an upstream router in case shown in FIG. 21.

A method of resource reservation at router R2 will be described when routers R1, R2, and R3 are present as in FIG. 21. As an initial condition, default VCs from router R1 to router R2 and from router R2 to router R3 exist. In this example, the ATM connection is a VP connection, and communication is unicast. FIG. 21 shows a view of message exchange. FIG. 17(b) shows an operation within a router on the downstream side (e.g. R3 in FIG. 21). FIGS. 16(c) and 16(d) and FIG. 22 show an operation within an upstream router (e.g. R2 in FIG. 21).

In FIG. 15, when an RESV message is received, neighboring routers R2 and R3 perform ATM signaling, and VCID propose/ACK message exchange. However, in the case of a VP or a p-p physical link, an ATM connection and a VPI/VCI itself which can be used as a VCID already exists, so these messages are absent in FIG. 21.

An upstream node, as shown in FIG. 22, obtains a downstream dedicated VC from unused VCs in a corresponding VP (S124) instead of ATM signaling (S64 in FIG. 16(a)), and sends a dedicated VC notify message (S125) instead of sending the VCID propose message (S65 of FIG. 16(a)). Also, no operation corresponding to FIG. 16(b) on receipt of a VCID ACK message is performed. A downstream node does not perform the operation of FIG. 17(a) which preferably happens when a VCID propose message is received.

(D-3) SVC and Multicast

A method of resource reservation at router R2 will be described when routers R1 through R4 are present as shown in FIG. 12. In this example, the ATM connection is SVC, and communication is multicast.

First, the case will be described in which a message notifying a neighboring node of which dedicated VC is used to transfer packets belonging to a given flow is sent in an out-band manner.

Figure 23:
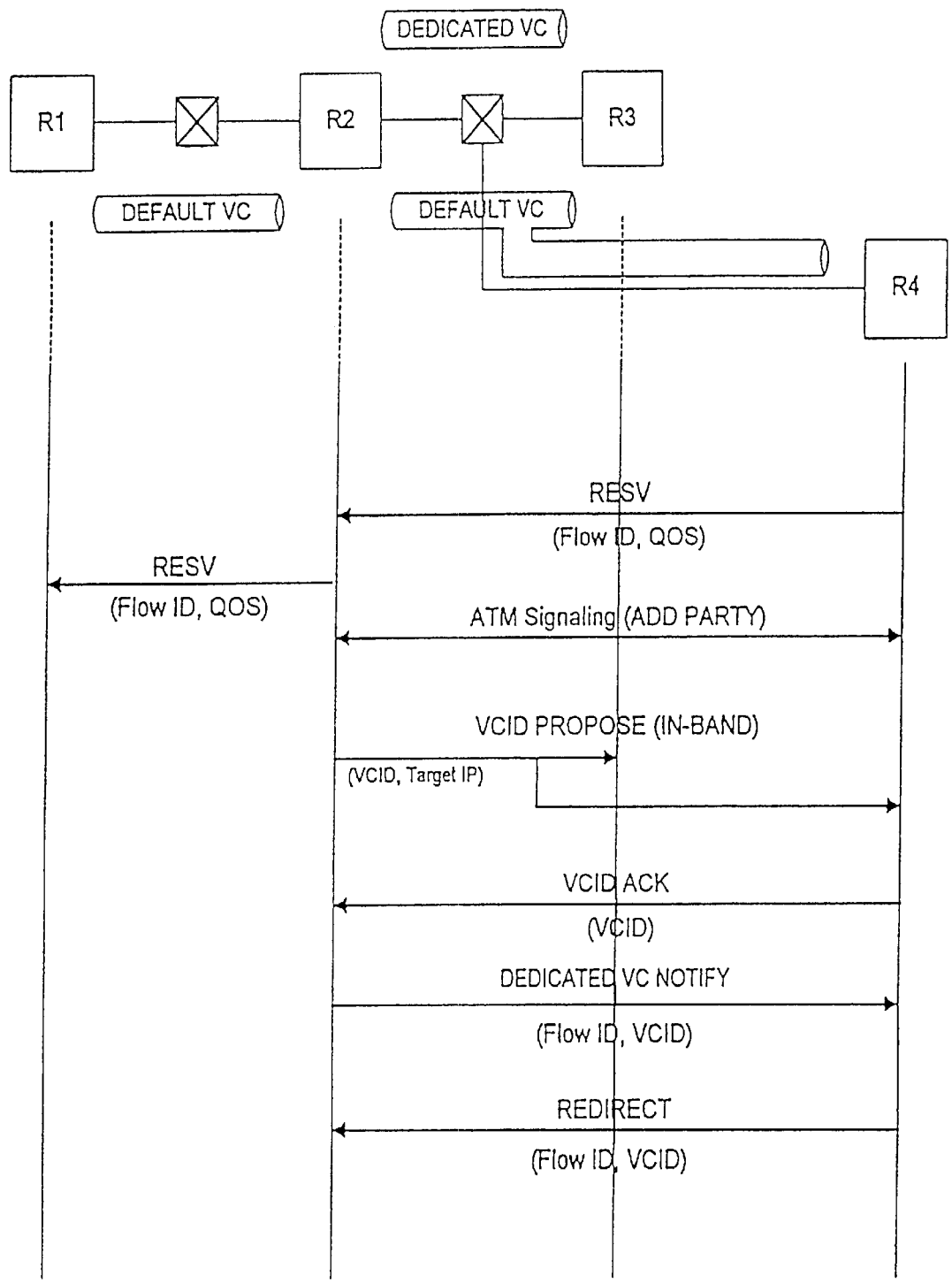
FIG. 23 shows an exemplary initial condition in networks and subsequent message exchanges between routers according to one embodiment of the present invention in case of SVC, multicast, out-band, and downstream dedicated VC set-up.

As an initial condition, as shown in FIG. 23, a multicast default VC (i.e. a default VC which can be a p-mp connection as present in this case) is set up from router R2 to router R3 and R4, a dedicated VC which can be a p-mp connection is set up from router R2 to router R3 as not present in this case, and a default VC (of p-p) is set up between router R1 and router R2. The dedicated VC from router R2 to router R3 is a VC dedicated to multicast group G. In addition, there exist p-p default VCs between routers R2 and R3, and between routers R2 and R4, as shown in FIG. 12.

The dedicated VC from router R2 to router R3 are set up according to the procedure described in the first half (out-band) of (D-1). In this case (D-3), the RESV, VCID ACK, dedicated VC notify, and redirect messages described in (D-1) are sent using the p-p default VC.

A method of resource reservation for packets of multicast group G at router R2 will be now described. FIG. 23 shows a view of message exchanges between routers. FIGS. 16(a)–16(d) show an operation within a router on the upstream side also in this case (e.g., R2 in FIG. 23). FIGS. 17(a)–17(b) show an operation within a downstream router also in this case (e.g., R4 in FIG. 23).

An RSVP reservation (RESV) message arrives at router R2 through the default VC from router R4 as shown in FIG. 23. This RESV message is originally sent by host H3 in response to the RSVP PATH message transferred downstream using the multicast default VC. The RESV message includes a Flow ID indicating for which packet flow resources are to be reserved, and a QOS requested by a data receiving node (host H3).

In accordance with the flow chart of FIG. 16(a), router R2, on receipt of an RESV message, checks whether adequate resources can be reserved in the IP scheduler (S61). If possible, resources are reserved (S62) and an RESV message is sent upstream (S63). If not, an RESV message is also sent upstream, but without reserving resources (S63).

Then, a new leaf to router R4 is added to the dedicated VC by ATM signaling (S64) and a VCID propose message is sent through the ATM connection (dedicated VC) to which the new leaf has been added (S65). The VCID propose message includes a target IP address and a VCID. In this case, the target IP address is the address of router R4.

The VCID propose message is received by routers R3 and R4. In accordance with the flow chart of FIG. 17(a), nodes that receive this message check whether the target IP address is their own IP addresses, respectively (S71). Since the target IP address is different from its own IP address, router R3 does not take any action. Since the target IP address is the same as its own IP address, router R4 approves the VCID and sends a VCID ACK message upstream (S72).

In accordance with the flow chart of FIG. 16(b), router R2, on receipt of the VCAD ACK message sends a dedicated VC notify message to router R4 (S66), in order to let the downstream node know that a VCID exchange has been completed and now the dedicated VC is in a usable condition. This message is sent onto the p-p default VC. This message includes the Flow ID and the VCID.

Router R4, which has received the dedicated VC notify message, knows that the dedicated VC specified by the VCID becomes usable exclusively for the flow specified by the Flow ID. In accordance with the flow chart of FIG. 17(b), since router R4 finds that there is no downstream dedicated VC for the Flow ID (S73:no), it sets an inside routing table to hand over packets received from the upstream dedicated VC to the IP processing unit (S74). However, if a corresponding dedicated VC is present, router R4 links the upstream dedicated VC and the downstream dedicated VC directly (S75).

Although router R4 has received packets through the p-mp dedicated VC since the new leaf was added to the dedicated VC by ADD PARTY, it may ignore the received packets because it may not know how to handle these packets until the dedicated VC notification message arrives. Until that time, router R4 can hand over packets coming through the multicast default VC to the IP processing unit for transfer.

When the dedicated VC has thus become usable at router R4, a redirect message is sent upstream (S76). This redirect message is sent by the p-p default VC and includes the Flow ID and VCID.

Router R2, which has received the redirect message, operates in accordance with the flow charts of FIGS. 16(c) and 16(d). That is, since the packets of the Flow ID have already been transfErred by the dedicated VC (S81:no), no action is taken.

However, if router R2 transfers the packets of the Flow ID onto the downstream dedicated VC without linking it with the upstream dedicated VC at a layer lower than IP (because there is no corresponding dedicated VC upstream) and satisfies the QOS requested by host H2 (via router R3) by the IP scheduling only, it is possible that router R2 cannot satisfy the QOS requested by host H3 (via router R4), even though it tries to reserve the requested resources in the IP scheduler. To cope with such a case, an upstream node that has received the redirect message executes steps S86 through S91 if there is no upstream dedicated VC having the same Flow ID (S82:No) and it is not a source node (S85:No), even if it is already using the downstream dedicated VC.

Thus, router R2 transmits an RESV Tear message to router R1 and an RESV ERROR message to router R4 if the QOS requested by host H3 cannot be satisfied either by the IP scheduling or by utilizing an ATM switching function. Also, router R2 can release the resources reserved for router R4 in the IP scheduler if it succeeds in linking a created upstream dedicated VC and the downstream dedicated VC. Further, router R2 can release the resources reserved for router R3 at this time, because linking the dedicated VC from router R1 and the p-mp dedicated VC to routers R3 and R4 may also satisfy the QOS requested by host H2 without IP scheduling.

In the case of multicast, the upstream node preferably continues to send packets identified by the Flow ID through the multicast default VC, while it switches the VC used for sending the packets from the default one to the dedicated one at step S84, in order to deal with the possibility that nodes that are receiving packets only through the multicast default VC without requesting cut-through transfer exist.

The resource reservation for router R4 at router R2 is completed as described above. The corresponding leaf of the p-mp dedicated VC is held by sending a redirect message periodically from router R4 to router R2 with suitable timing. Regarding the leaf corresponding to router R3, router R3 sends a redirect message to router R2. This redirect message can be replaced by the RESV message that is periodically sent upstream. When a redirect message (or an RESV message substituting for the redirect message) has ceased to be received from a downstream router, the leaf to that router will be deleted from the p-mp dedicated VC.

Next, the case will be described in which a message notifying a neighboring node of which dedicated VC is used to transfer packets belonging to a given flow is sent in an in-band manner.

Figure 24:
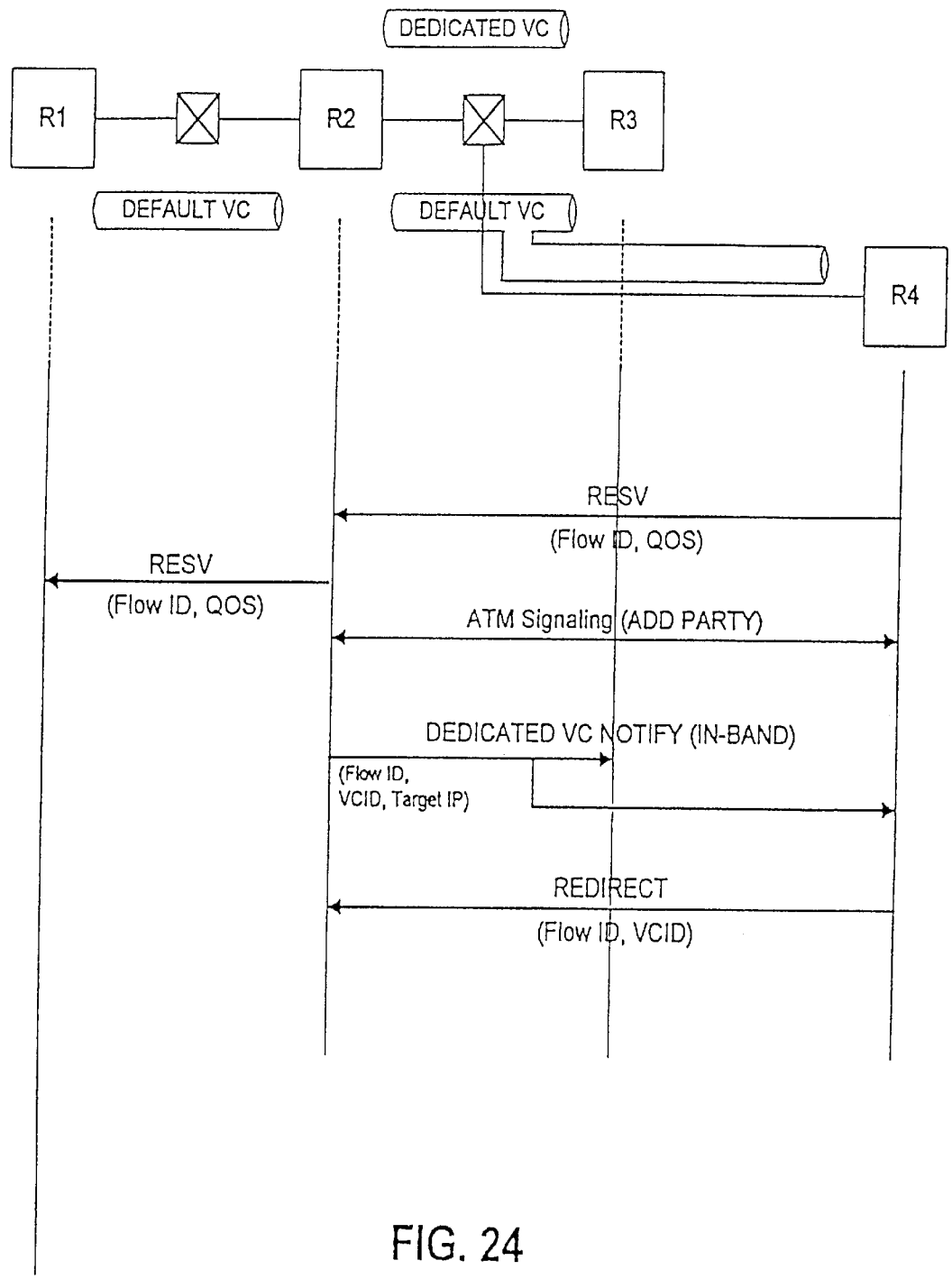
FIG. 24 shows an exemplary initial condition in networks and subsequent message exchanges between routers according to one embodiment of the present invention in case of SVC, multicast, in-band, and downstream dedicated VC set-up.

As an initial condition, as shown in FIG. 24, the multicast default VC is set up from router R2 to routers R3 and R4. The dedicated VC for multicast group G from router R2 to router R3 is set up according to the procedure described in the second half (in-band) of (D-1). In this (D-3), the RESV and redirect messages described in (D-1) are sent using the p-p default VC.

FIG. 24 shows a view of message exchanges between routers. FIGS. 16(c) and 16(d) and FIG. 19 show an operation within a router on the upstream side also in this case (e.g., R2 in FIG. 24). FIG. 20 shows an operation within a downstream router also in this case (e.g., R4 in FIG. 24).

The differences from the out-band case for multicast are that the VCID propose and VCID ACK messages are dispensed with, and that the dedicated VC notify message is transfErred through the ATM connection (dedicated VC) to which the new leaf has been added. Also, the dedicated VC notify message in the in-band case includes the target IP address, in addition to the Flow ID and the VCID.

E. Set-up of Cut-through Connection with Other Trigger Than RSVP

Setting up dedicated VCs utilized in CSR technique can also be done in another way, not triggered by the RESV message of RSVP as described above. For example, a data packet may trigger set-up of a dedicated VC. In multicast communication, a protocol for managing multicast group members (e.g. IGMP (Internet Group Management Protocol), PIM (Protocol-Independent Multicast), DVMPR (Distance Vector Multicast Routing Protocol), etc.) also may trigger the set-up of the dedicated VC.

(E-1) Set-up of Upstream Dedicated VC

The case triggered by RSVP described in (C) differs in at least two respects. First, while a router that has received an RESV message from a downstream node sends a dedicated VC request message to an upstream node in the RSVP case, a router that has received a data packet from an upstream node sends a dedicated VC request message to the upstream node in the non-RSVP case. That is, a data packet is a trigger, in a situation where no protocol for resource reservation is not activated. After that, the node operates in the same way as described in the RSVP case, to set up and utilize a dedicated VC for transfer of a specific packet flow to which the data packet belongs. Second, a router that has received a dedicated VC notify message does not send any RESV message.

Specifically, for example, router R2 of FIG. 2, which receives a data packet through the default VC from router R1, transfers this data packet to a next-hop node (router R3) by the default VC (or dedicated VC), and then sends a dedicated VC request message upstream (to router R1) so as to set up on the upstream side a dedicated VC having a Flow ID related to the data packet. The Flow ID is determined based on a set of source address/port and destination address/port contained in the data packet. The Flow ID could be a destination address only, for example. The determined Flow ID is included in the dedicated VC request message.

When router R2 knows, by a dedicated VC notify message, that a dedicated VC has been set up from router R1, it checks for a dedicated VC on the downstream side (to router R3) having the same Flow ID. If one exists, it links the dedicated VCs. If not, it transfers packets arriving through the dedicated VC from router R1 onto the default VC to router R3. Also, when router R1, by a redirect message, finds out that router R2 has become capable of using a dedicated VC, it transfers new data packets onto the dedicated VC to router R2, instead of using the default VC.

After that, for example, router R4 of FIG. 12, which receives a data packet through the multicast default VC (router R1 transfers packets onto the dedicated VC for router R3 and onto the default VC for router R4), transfers this data packet onto the default VC (or dedicated VC) to a next-stage node (host H3), and then sends upstream (to router R2) by the p-p default VC a dedicated VC request message for set-up of a dedicated VC having the Flow ID determined based on the data packet (in this case, the destination address is a multicast address).

When router R4 learns, by the dedicated VC notify message, that a leaf to router R4 has been added to the dedicated VC from router R2, it checks for a dedicated VC on the downstream side having the same Flow ID. If so, it links the dedicated VCs. If not, it transfers packets arriving through the dedicated VC from router R2 onto the default VC to host H3. Router R2 may maintain the leaves of the p-mp dedicated VC to router R3 and R4 according to whether a redirect message is periodically sent through the corresponding p-p default VC from routers R3 and R4, respectively. Alternatively, in this case, router R2 may maintain the leaves unless it does not receive an explicit release message from router R3 or R4.

When a data packet is used as a trigger in this way, it is possible for a node to select the data packet to be a trigger. That is, the node does not use every data packet as a trigger, but uses a data packet selected based on information contained in the data packet, in order to establish a cut-through connection only for a relatively long-life session.

(E-2) Set-up of Downstream Dedicated VC

The case triggered by RSVP described in (D) differs in two respects. First, while a router that has received an RESV message from a downstream node performs ATM signaling to set up a downstream dedicated VC in the RSVP case, a router that has received a data packet from an upstream node does so in the non-RSVP case. After that, the node operates in the same way as described in the RSVP case, to utilize a dedicated VC for transfer of a specific packet flow to which the data packet belongs. Second, a router that has received a dedicated VC notify message does not send any RESV or RESV Tear message.

For example, router R2 of FIG. 2, which receives a data packet through the default VC from router R1, transfers this data packet to a next-hop node (router R3) by the default VC (or dedicated VC), and then performs ATM signaling so as to set up a dedicated VC to the next-hop node having a Flow ID related to the data packet. The Flow ID determined as described in (E-1) is included in a dedicated VC notify message sent downstream by router R2.

When router R2 learns, by a redirect message, that router R3 has become capable of using the dedicated VC, it checks whether there is a dedicated VC on the upstream side (from router R1) having the same Flow ID. If so, it links the dedicated VCs. If not, it transfers packets arriving through the default VC from router R1 onto the dedicated VC to router R3.

When router R2 recognizes that router R4 is participating in the multicast group G by a protocol for IP multicast (e.g. IGMP, PIM, DVMRP, etc.), it performs ADD PARTY so as to add a new leaf to downstream dedicated VC having a Flow ID related to the multicast. A leaf to router R4 is then added to the dedicated VC from router R2 to router R3. Router R2 maintains the leaves of the p-mp dedicated VC to router R3 and R4 according to whether a redirect message is periodically sent through the corresponding p-p default VC from routers R3 and R4 respectively. The IP multicast protocol message that is periodically sent upstream can replace the redirect message to hold the corresponding leaf as described above.

F. Other Variations

In addition to those already mentioned above, persons of ordinary skill will realize that many modifications and variations of the above embodiments may be made without departing from the novel and advantageous features of the present invention.

For example, in case for setting up an upstream dedicated VC, to cope with a situation where a dedicated VC fails to be set up or a new leaf fails to be added to the dedicated VC (e.g., ATM signaling could not be completed because of insufficient bandwidth, a VCID propose or dedicated VC notify message did not return) though a router sent a dedicated VC request upstream, the router can send a RESV ERROR message downstream if adequate resources are not reserved in IP scheduler.

Similarly, in case for setting up a downstream dedicated VC, if a dedicated VC fails to be set up or a new leaf fails to be added to the dedicated VC (e.g., ATM signaling could not be completed because of insufficient bandwidth, a VCID ACK or redirect message did not return) though a router tried to perform ATM signaling to set up a dedicated VC downstream, the router can send a RESV Tear message upstream and a RESV ERROR message downstream if adequate resources are not reserved in IP scheduler.

In some cases, it may be desirable for a downstream node to send a VCID propose message, although the upstream node sends it in the above-mentioned embodiments.

It may also be desirable to include a VCID in ATM signaling message to dispense with the VCID propose and VCID ACK messages in the above-mentioned embodiments.

It may also be desirable for a downstream node to send a dedicated VC notify message, although the upstream node sends it in the above-mentioned embodiments. In a case where the downstream node sends a message for notifying a neighboring node of correspondence between a Flow ID and a VCID of the dedicated VC (in the above-mentioned embodiments, a dedicated VC notify message), the message can be replaced by an RESV message itself. In other words, sending an RESV message including a VCID in addition to a Flow ID and a requested QOS to an upstream node can dispense with the dedicated VC notify and redirect messages.

It may also be desirable to omit sending the VCID ACK message and/or the redirect message in the above-mentioned embodiments, in a case of using reliable connections.

Also, though a p-p dedicated VC to a node that has sent a RESV message is set up or a leaf to the node. is added to the multicast dedicated VC in the above-mentioned embodiments, it may be desirable to set up a p-mp dedicated VC to all downstream nodes that belongs to one multicast group in one logical network when one of the downstream nodes has sent a RESV message. In this case, the multicast default VC in the logical network can be released because all downstream nodes of the multicast group in the logical network become able to receive packets through the p-mp dedicated VC at the same time.

Accordingly, all such modifications and variations are intended to be included within the scope of the appended claims.

The specification and examples are only exemplary. The following claims define the true scope and sprit of the invention.

What is claimed is:

1. A router apparatus, comprising:
 a memory capable of storing a correspondence relationship between a first virtual connection to be used in receiving a packet from one logical network and a second virtual connection to be used in transmitting the packet to another logical network;
 means for receiving a first message for resource reservation from said another logical network;
 means for transmitting a second message for the resource reservation based on the first message received by the means for receiving to said one logical network when existence of the first and second virtual connections is detected, and determining not to transmit the second message when the existence is not detected and the resource reservation is judged not to be achieved;
 means for transferring the packet received through the first virtual connection onto the second virtual connection according to the correspondence relationship stored in the memory; and
 wherein the means for transmitting includes means for determining whether to transmit the second message responsive to the existence, when a quality of service indicated in the first message is judged not to become satisfied unless the packet is transferred by the means for transferring.

2. The apparatus according to claim 1, further comprising means for transmitting a third message for notifying a failure of the resource reservation required by the first message to said another logical network, when the means for determining determines not to transmit the second message.

3. A router apparatus, comprising:
 a memory capable of storing a correspondence relationship between a first virtual connection to be used in receiving a packet from one logical network and a second virtual connection to be used in transmitting the packet to another logical network;
 means for receiving a first message for resource reservation from said another logical network;
 means for transmitting a second message for the resource reservation based on the first message received by the means for receiving to said one logical network;
 means for canceling the second message transmitted by the means for transmitting when either the first or second virtual connection does not exist and the resource reservation is judged not to be achieved;
 means for transferring the packet received through the first virtual connection onto the second virtual connection according to the correspondence relationship stored in the memory; and
 wherein the means for canceling includes means for determining whether to cancel the second message responsive to the existence, when a quality of service indicated in the first message is judges not to become satisfied unless the packet is transferred by the means for transferring.

4. The apparatus according to claim 3, further comprising
 means for transmitting a third message for notifying a failure of the resource reservation required by the first message to said another logical network, when the means for determining determines to cancel the second message.

5. A method of operating a router usable to transfer a packet from a first node belonging to one logical network to a second node belonging to another logical network, comprising the steps of:
 receiving a first message for resource reservation from the second node;
 storing a correspondence relationship between a first virtual connection available for receiving a packet of a specified flow from the first node and a second virtual connection available for transmitting the packet of the specified flow to the second node, when the first and second virtual connections exist;
 transmitting a second message for the resource reservation based on the first message to the first node, when the correspondence relationship can be stored;
 determining not to transmit the second message, when the correspondence relationship cannot be stored and the resource reservation is judged not to be achieved;
 transferring a packet received through the first virtual connection onto the second virtual connection according to the stored correspondence relationship;
 transferring, at a network layer, a packet from said one logical network to said another logical network; and
 transmitting the second message irrespective of whether or not the correspondence relationship can be stored, when the resource reservation required by the first message can be achieved by scheduling the network-layer transferring step.

6. The method according to claim 5, further comprising the step of
 utilizing the stored correspondence relationship to transfer the packet rather than scheduling the network-layer transfer step, when the correspondence relationship can be stored.

7. A method of operating a router usable to transfer a packet from a first node belonging to one logical network to a second node belonging to another logical network, comprising the steps of:
 receiving a first message for resource reservation from the second node;

storing a correspondence relationship between a first virtual connection available for receiving a packet of a specified flow from the first node and a second virtual connection available for transmitting the packet of the specified flow to the second node, when the first and second virtual connections exist;

transmitting a second message for the resource reservation based on the first message to the first node, when the correspondence relationship can be stored;

determining not to transmit the second message, when the correspondence relationship cannot be stored and the resource reservation is judged not to be achieved;

requesting, in response to the first message, a set-up of the first virtual connection to said one logical network;

transferring a packet received through the first virtual connection onto the second virtual connection according to the stored correspondence relationship; and transmitting a third message for notifying a failure of the resource reservation required by the first message to the second node, when the second virtual connection does not exist and the resource reservation required by the first message is judged not to be achieved unless the packet can be transferred by the transferring step.

8. A method of operating a router usable to transfer a packet from a first node belonging to one logical network to a second node belonging to another logical network, comprising the steps of:

receiving a first message for resource reservation from the second node;

transmitting a second message for the resource reservation based on the first message to the first node;

storing a correspondence relationship between a first virtual connection available for receiving a packet of a specified flow from the first node and a second virtual connection available for transmitting the packet of the specified flow to the second node, when the first and second virtual connections exist;

transmitting a cancellation message to the first node for canceling the second message, when the correspondence relationship cannot be stored and the resource reservation is judged not to be achieved;

transferring a packet received through the first virtual connection onto the second virtual connection according to the stored correspondence relationship; and transferring, at a network layer, a packet from said one logical network to said another logical network, and wherein the step of transmitting the cancellation message includes the step of determining to transmit the cancellation message, when neither scheduling the network-layer transferring step nor storing the correspondence relationship can achieve the resource reservation required by the first message.

9. A method of operating a router usable to transfer a packet from a first node belonging to one logical network to a second node belonging to another logical network, comprising the steps of:

receiving a first message for resource reservation from the second node;

transmitting a second message for the resource reservation based on the first message to the first node;

storing a correspondence relationship between a first virtual connection available for receiving a packet of a specified flow from the first node and a second virtual connection available for transmitting the packet of the specified flow to the second node, when the first and second virtual connections exist;

transmitting a cancellation message to the first node for canceling the second message, when the correspondence relationship cannot be stored and the resource reservation is judged not to be achieved;

setting up, in response to the first message, the second virtual connection in said another logical network;

transferring a packet received through the first virtual connection onto the second virtual connection according to the stored correspondence relationship; and waiting for the first virtual connection set up for a predetermined period, and wherein the step of transmitting the cancellation message includes the step of determining to transmit the cancellation message, when the first virtual connection is not set up after the waiting step and the resource reservation required by the first message is judged not to be achieved unless the packet can be transferred by the transferring step.

10. The method according to claim 8, further comprising the step of utilizing the stored correspondence relationship to transfer a packet rather than scheduling the network-layer transfer step, when the correspondence relationship can be stored.

* * * * *